(12) United States Patent
Foderaro et al.

(10) Patent No.: US 12,148,146 B2
(45) Date of Patent: Nov. 19, 2024

(54) SYSTEMS AND METHODS FOR MAPPING COATINGS TO A SPATIAL APPEARANCE SPACE

(71) Applicant: PPG Industries Ohio, Inc., Cleveland, OH (US)

(72) Inventors: Anthony J. Foderaro, Parma, OH (US); Alison M. Norris, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 17/753,640

(22) PCT Filed: Sep. 18, 2020

(86) PCT No.: PCT/US2020/051487
§ 371 (c)(1),
(2) Date: Mar. 10, 2022

(87) PCT Pub. No.: WO2021/055745
PCT Pub. Date: Mar. 25, 2021

(65) Prior Publication Data
US 2024/0046444 A1 Feb. 8, 2024

Related U.S. Application Data

(60) Provisional application No. 62/902,520, filed on Sep. 19, 2019.

(51) Int. Cl.
*G06T 7/90* (2017.01)
*G06T 7/00* (2017.01)
(Continued)

(52) U.S. Cl.
CPC ............. *G06T 7/001* (2013.01); *G06T 7/40* (2013.01); *G06T 7/70* (2017.01); *G06T 7/90* (2017.01);
(Continued)

(58) Field of Classification Search
CPC .. G06T 7/001; G06T 7/90; G06T 7/70; G06T 7/40; G06T 2200/24; G06T 2207/10024;
(Continued)

(56) References Cited

U.S. PATENT DOCUMENTS 3,999,864 A  12/1976  Mutter
4,090,243 A   5/1978  Kotera et al.
(Continued)

FOREIGN PATENT DOCUMENTS

AR   089896 A1   9/2014
AR   092634 A1   4/2015
(Continued)

OTHER PUBLICATIONS

US 10,044,986 B2, 08/2018, Beymore (withdrawn)
(Continued)

*Primary Examiner* — Jonathan S Lee
(74) *Attorney, Agent, or Firm* — PPG Industries, Inc. IP Law Group

(57) ABSTRACT

A computer system for mapping coatings to a spatial appearance space may receive coating spatial appearance variables of a target coating from a coating-measurement instrument. The computer system may generate spatial appearance space coordinates for the target coating by mapping each of the coating spatial appearance variables to an individual axis of a multidimensional coordinate system. The computer system may identify particular spatial appearance space coordinates from the identified spatial appearance space coordinates associated with the potentially matching reference coatings
(Continued)

that are associated with a smallest spatial-appearance-space distance from the spatial appearance space coordinates of the target coating. Further, the computer system may display a visual interface element indicating a particular reference coating that is associated with the particular spatial appearance space coordinates as a proposed spatial appearance match to the target coating.

20 Claims, 8 Drawing Sheets

(51) Int. Cl.
G06T 7/40 (2017.01)
G06T 7/70 (2017.01)
G06V 10/60 (2022.01)
G06V 10/74 (2022.01)

(52) U.S. Cl.
CPC .............. *G06V 10/60* (2022.01); *G06V 10/74* (2022.01); *G06T 2200/24* (2013.01); *G06T 2207/10024* (2013.01); *G06T 2207/30156* (2013.01)

(58) Field of Classification Search
CPC .......... G06T 2207/30156; G06V 10/74; G06V 10/60
USPC ........................................................ 382/108
See application file for complete search history.

(56) References Cited

U.S. PATENT DOCUMENTS

| | | |
|---|---|---|
| 4,165,180 A | 8/1979 | Failes |
| 4,344,709 A | 8/1982 | Provder et al. |
| 4,479,718 A | 10/1984 | Alman |
| 4,572,672 A | 2/1986 | Orchard et al. |
| 4,580,787 A | 4/1986 | Baker |
| 4,677,079 A | 6/1987 | Langhals |
| 4,692,481 A | 9/1987 | Kelly |
| 4,711,580 A | 12/1987 | Venable |
| 4,802,763 A | 2/1989 | Gerlinger et al. |
| 4,813,000 A | 3/1989 | Wyman et al. |
| 4,853,879 A | 7/1989 | Matzoll et al. |
| 5,021,645 A | 6/1991 | Satula et al. |
| 5,155,558 A | 10/1992 | Tannenbaum et al. |
| 5,231,472 A | 7/1993 | Marcus et al. |
| 5,483,339 A | 1/1996 | Van Aken et al. |
| 5,583,642 A | 12/1996 | Nakazono |
| 5,590,251 A | 12/1996 | Takagi |
| 5,632,615 A | 5/1997 | Degarmo |
| 5,668,633 A | 9/1997 | Cheetham et al. |
| 5,740,079 A | 4/1998 | Shigemori et al. |
| 5,807,435 A | 9/1998 | Poliniak et al. |
| 5,907,495 A | 5/1999 | Snyder et al. |
| 5,907,629 A | 5/1999 | Funt et al. |
| 5,917,541 A | 6/1999 | Nakagome et al. |
| 5,926,262 A | 7/1999 | Jung et al. |
| 5,929,998 A | 7/1999 | Kettler et al. |
| 6,064,487 A | 5/2000 | Kettler et al. |
| 6,147,854 A | 11/2000 | Kirschner |
| 6,166,814 A | 12/2000 | Pringle |
| 6,249,751 B1 | 6/2001 | Asaba et al. |
| 6,322,636 B1 | 11/2001 | Matsugu |
| 6,362,885 B1 | 3/2002 | Osumi et al. |
| 6,389,287 B1 | 5/2002 | Smith et al. |
| 6,539,325 B1 | 3/2003 | Numata et al. |
| 6,655,088 B1 | 12/2003 | Hoermann |
| 6,695,594 B1 | 2/2004 | Pastori |
| 6,714,924 B1 | 3/2004 | McClanahan |
| 6,747,662 B2 | 6/2004 | Masuda et al. |
| 6,750,970 B2 | 6/2004 | Masuda |
| 6,768,814 B1 | 7/2004 | Spitzer et al. |
| 6,788,413 B2 | 9/2004 | Torfs et al. |
| 6,804,390 B2 | 10/2004 | McClanahan |
| 6,870,614 B2 | 3/2005 | Graf et al. |
| 6,883,593 B2 | 4/2005 | Johnson et al. |
| 6,888,634 B2 | 5/2005 | Jung et al. |
| 6,891,617 B2 | 5/2005 | Alman |
| 6,928,454 B2 | 8/2005 | Menner et al. |
| 6,944,335 B2 | 9/2005 | Pettigrew et al. |
| 6,959,111 B2 | 10/2005 | Hirayama et al. |
| 6,975,404 B2 | 12/2005 | Schwarz |
| 6,992,277 B2 | 1/2006 | Masuda et al. |
| 6,993,512 B2 | 1/2006 | Mcclanahan |
| 6,999,167 B2 | 2/2006 | Carroll et al. |
| 6,999,615 B2 | 2/2006 | McClanahan et al. |
| 7,033,656 B2 | 4/2006 | Nahill et al. |
| 7,035,464 B2 | 4/2006 | Masuda |
| 7,045,169 B2 | 5/2006 | Freeman et al. |
| 7,069,198 B2 | 6/2006 | Snyder et al. |
| 7,116,420 B2 | 10/2006 | Skierski et al. |
| 7,136,790 B1 | 11/2006 | Hobbs et al. |
| 7,142,307 B1 | 11/2006 | Stark |
| 7,145,656 B2 | 12/2006 | Rodrigues et al. |
| 7,167,246 B1 | 1/2007 | Skierski |
| 7,233,398 B2 | 6/2007 | Kitazawa |
| 7,259,852 B2 | 8/2007 | Masuda |
| 7,264,160 B2 | 9/2007 | Polarine et al. |
| 7,277,174 B2 | 10/2007 | Yamanouchi et al. |
| 7,283,244 B2 | 10/2007 | Takagi |
| 7,298,462 B2 | 11/2007 | Udo et al. |
| 7,337,162 B2 | 2/2008 | Lewis |
| 7,378,570 B1 | 5/2008 | Lambeth et al. |
| 7,405,737 B2 | 7/2008 | Masuda et al. |
| 7,474,314 B2 | 1/2009 | Minchew et al. |
| 7,567,348 B2 | 7/2009 | Sperling et al. |
| 7,587,154 B2 | 9/2009 | Sakai et al. |
| 7,663,144 B2 | 2/2010 | Misawa |
| 7,736,723 B2 | 6/2010 | Wilkie |
| 7,760,651 B2 | 7/2010 | Fan et al. |
| 7,761,398 B2 | 7/2010 | Jamjoom et al. |
| 7,804,597 B2 | 9/2010 | De et al. |
| 7,827,163 B2 | 11/2010 | Masuda et al. |
| 7,991,596 B2 | 8/2011 | Steenhoek |
| 8,031,938 B2 | 10/2011 | Edge |
| 8,062,738 B2 | 11/2011 | Yoon et al. |
| 8,065,314 B2 | 11/2011 | Prakash et al. |
| 8,074,007 B2 | 12/2011 | James |
| 8,103,491 B2 | 1/2012 | Steenhoek |
| 8,237,636 B2 | 8/2012 | Oota et al. |
| 8,271,242 B2 | 9/2012 | Berlin et al. |
| 8,290,275 B2 | 10/2012 | Sai et al. |
| 8,339,665 B2 | 12/2012 | Sai et al. |
| 8,340,937 B2 | 12/2012 | Skinner et al. |
| 8,345,252 B2 | 1/2013 | Nisper et al. |
| 8,385,073 B2 | 2/2013 | Tam et al. |
| 8,407,014 B2 | 3/2013 | Prakash et al. |
| 8,538,493 B2 | 9/2013 | Zhu et al. |
| 8,692,991 B2 | 4/2014 | Beymore et al. |
| 8,743,364 B2 | 6/2014 | Krause et al. |
| 8,746,725 B2 | 6/2014 | Harkcom et al. |
| 8,780,349 B2 | 7/2014 | Okumura |
| 8,818,289 B2 | 8/2014 | Schumacher |
| 8,867,043 B2 | 10/2014 | Schwarz et al. |
| 8,879,066 B2 | 11/2014 | Norris |
| 8,883,945 B2 | 11/2014 | McNamee et al. |
| 8,886,223 B2 | 11/2014 | Markhovsky et al. |
| 9,047,693 B2 | 6/2015 | Adachi et al. |
| 9,080,915 B2 | 7/2015 | Krause et al. |
| 9,164,254 B2 | 10/2015 | Chen et al. |
| 9,200,999 B2 | 11/2015 | Fan et al. |
| 9,236,609 B2 | 1/2016 | Park et al. |
| 9,292,744 B2 | 3/2016 | Rodrigues et al. |
| 9,482,657 B2 | 10/2016 | Bell et al. |
| 9,547,243 B2 | 1/2017 | Poon et al. |
| 9,606,055 B2 | 3/2017 | Norris |
| 9,607,403 B2 | 3/2017 | Beymore et al. |
| 9,734,590 B2 | 8/2017 | Prakash |
| 9,738,180 B2 | 8/2017 | Ioppolo |
| 9,778,819 B2 | 10/2017 | Petterson et al. |
| 9,779,101 B2 | 10/2017 | Klum et al. |
| 9,782,089 B2 | 10/2017 | Zhang et al. |

(56) References Cited

U.S. PATENT DOCUMENTS

| | | |
|---|---|---|
| 9,791,318 B2 | 10/2017 | Kirchner et al. |
| 9,816,862 B2 | 11/2017 | Norris |
| 9,818,205 B2 | 11/2017 | Neisen |
| 9,830,429 B2 | 11/2017 | Norris |
| 9,870,073 B2 | 1/2018 | Honda |
| 9,874,476 B2 | 1/2018 | Kettler et al. |
| 9,874,698 B2 | 1/2018 | Fondeur et al. |
| 9,874,700 B2 | 1/2018 | Sugama |
| 9,905,027 B2 | 2/2018 | Beymore et al. |
| 10,031,071 B2 | 7/2018 | Norris |
| 10,037,832 B2 | 7/2018 | Hersam et al. |
| 10,063,960 B2 | 8/2018 | Aase |
| 10,132,142 B2 | 11/2018 | Veland |
| 10,147,043 B2 | 12/2018 | Beymore |
| 10,152,494 B2 | 12/2018 | Thomas et al. |
| 10,178,351 B2 | 1/2019 | Beymore et al. |
| 10,233,578 B2 | 3/2019 | Hall |
| 10,246,216 B2 | 4/2019 | Fath |
| 10,565,740 B2 | 2/2020 | Beymore et al. |
| 10,586,162 B2 | 3/2020 | Beymore |
| 10,613,727 B2 | 4/2020 | Beymore et al. |
| 10,619,370 B2 | 4/2020 | Huang et al. |
| 10,713,675 B2 | 7/2020 | Zafiroglu et al. |
| 10,737,250 B2 | 8/2020 | Wang et al. |
| 11,025,107 B2 | 5/2021 | Paritee et al. |
| 11,032,247 B2 | 6/2021 | Newell et al. |
| 11,032,248 B2 | 6/2021 | Kumar et al. |
| 2001/0036309 A1 | 10/2001 | Hirayama et al. |
| 2001/0036310 A1 | 10/2001 | Pettigrew et al. |
| 2002/0063721 A1 | 5/2002 | Masuda et al. |
| 2002/0106121 A1* | 8/2002 | McClanahan ............ G06T 7/90 382/156 |
| 2002/0109842 A1 | 8/2002 | Carroll et al. |
| 2002/0118357 A1 | 8/2002 | Torfs et al. |
| 2002/0152049 A1 | 10/2002 | Lewis |
| 2002/0163640 A1 | 11/2002 | Masuda |
| 2002/0167669 A1 | 11/2002 | Schwarz |
| 2002/0181766 A1 | 12/2002 | McClanahan et al. |
| 2002/0184167 A1 | 12/2002 | McClanahan |
| 2002/0184232 A1 | 12/2002 | Menner et al. |
| 2003/0048942 A1 | 3/2003 | Masuda |
| 2003/0103199 A1 | 6/2003 | Jung et al. |
| 2003/0124244 A1 | 7/2003 | Freeman et al. |
| 2003/0125911 A1 | 7/2003 | Snyder et al. |
| 2003/0193669 A1 | 10/2003 | Takagi |
| 2003/0223060 A1 | 12/2003 | Graf et al. |
| 2004/0030510 A1 | 2/2004 | Van et al. |
| 2004/0051873 A1 | 3/2004 | Alman |
| 2004/0073526 A1* | 4/2004 | McClanahan ............ G01J 3/462 356/402 |
| 2004/0131756 A1 | 7/2004 | Skierski et al. |
| 2004/0179023 A1 | 9/2004 | Masuda et al. |
| 2004/0201847 A1 | 10/2004 | Yamanouchi et al. |
| 2004/0239928 A1 | 12/2004 | Masuda |
| 2004/0239935 A1 | 12/2004 | Kitazawa |
| 2004/0252308 A1* | 12/2004 | Prakash ............... G01N 21/474 356/445 |
| 2005/0018173 A1 | 1/2005 | Udo et al. |
| 2005/0018191 A1 | 1/2005 | Luo et al. |
| 2005/0044111 A1 | 2/2005 | Masuda et al. |
| 2005/0110797 A1 | 5/2005 | Masuda et al. |
| 2005/0128484 A1 | 6/2005 | Rodrigues et al. |
| 2005/0173525 A1 | 8/2005 | Polarine et al. |
| 2006/0119854 A1 | 6/2006 | Sperling et al. |
| 2006/0152527 A1 | 7/2006 | Minchew et al. |
| 2006/0155519 A1 | 7/2006 | Minchew et al. |
| 2007/0059442 A1 | 3/2007 | Sabeta |
| 2007/0172113 A1* | 7/2007 | Sai .................. G01N 21/25 382/162 |
| 2007/0250273 A1 | 10/2007 | De Haas et al. |
| 2007/0273885 A1 | 11/2007 | Njo et al. |
| 2007/0273890 A1 | 11/2007 | Njo |
| 2008/0177586 A1 | 7/2008 | Jamjoom et al. |
| 2009/0015835 A1 | 1/2009 | Balakrishnan et al. |
| 2009/0019086 A1* | 1/2009 | Prakash .................. G01J 3/46 |
| 2009/0157212 A1 | 6/2009 | McClanahan et al. |
| 2009/0213120 A1 | 8/2009 | Nisper et al. |
| 2009/0257648 A1 | 10/2009 | Edge |
| 2009/0284772 A1 | 11/2009 | Sai et al. |
| 2009/0296118 A1 | 12/2009 | Tsukamoto |
| 2010/0027870 A1 | 2/2010 | Rodrigues et al. |
| 2010/0049484 A1 | 2/2010 | Berlin et al. |
| 2010/0094601 A1 | 4/2010 | Steenhoek |
| 2011/0013176 A1 | 1/2011 | Schwarz et al. |
| 2011/0085169 A1 | 4/2011 | Craighead et al. |
| 2011/0246087 A1 | 10/2011 | Prakash et al. |
| 2011/0250351 A1 | 10/2011 | Steenhoek |
| 2011/0282613 A1 | 11/2011 | Skinner et al. |
| 2012/0098845 A1 | 4/2012 | Kirchner et al. |
| 2012/0303376 A1 | 11/2012 | Shishido et al. |
| 2013/0083991 A1 | 4/2013 | Rodrigues et al. |
| 2013/0188186 A1 | 7/2013 | Okumura |
| 2013/0201476 A1 | 8/2013 | Beymore et al. |
| 2014/0078293 A1 | 3/2014 | Beymore et al. |
| 2014/0118736 A1 | 4/2014 | Norris |
| 2014/0168251 A1 | 6/2014 | Hagiwara et al. |
| 2014/0195189 A1 | 7/2014 | Norris |
| 2014/0239234 A1 | 8/2014 | Krause et al. |
| 2014/0242271 A1 | 8/2014 | Prakash et al. |
| 2014/0244558 A1 | 8/2014 | Mohammadi et al. |
| 2014/0267227 A1 | 9/2014 | Norris |
| 2014/0278251 A1 | 9/2014 | Norris |
| 2014/0278253 A1 | 9/2014 | Beymore |
| 2014/0278254 A1 | 9/2014 | Beymore |
| 2014/0350867 A1 | 11/2014 | Alspach et al. |
| 2014/0350895 A1 | 11/2014 | Kettler et al. |
| 2015/0026298 A1 | 1/2015 | Kirchner et al. |
| 2015/0070694 A1 | 3/2015 | Fan et al. |
| 2015/0127269 A1 | 5/2015 | Bell et al. |
| 2015/0134269 A1 | 5/2015 | Norris |
| 2015/0134299 A1 | 5/2015 | Norris |
| 2015/0134300 A1 | 5/2015 | Norris |
| 2016/0005187 A1 | 1/2016 | Prakash |
| 2016/0019208 A1 | 1/2016 | Thomas et al. |
| 2016/0117844 A1 | 4/2016 | Beymore et al. |
| 2016/0231173 A1 | 8/2016 | Panja |
| 2016/0258865 A1 | 9/2016 | Kawano et al. |
| 2017/0242570 A1 | 8/2017 | Beymore et al. |
| 2017/0243362 A1 | 8/2017 | Neisen |
| 2017/0328774 A1 | 11/2017 | Vignolo et al. |
| 2018/0144505 A1 | 5/2018 | Krawciw et al. |
| 2022/0381615 A1* | 12/2022 | Bischoff ............ H04N 1/6038 |
| 2023/0349765 A1 | 11/2023 | Kettler et al. |

FOREIGN PATENT DOCUMENTS

| | | |
|---|---|---|
| AR | 093150 A1 | 5/2015 |
| AR | 094408 A1 | 7/2015 |
| AR | 095315 A1 | 10/2015 |
| AR | 095316 A1 | 10/2015 |
| AR | 095317 A1 | 10/2015 |
| AR | 095318 A1 | 10/2015 |
| AR | 098346 A1 | 5/2016 |
| AT | 438842 T | 8/2009 |
| AU | 11350/83 A | 8/1983 |
| AU | 0558197 B2 | 1/1987 |
| AU | 592877 B2 | 1/1990 |
| AU | 48069/96 A | 9/1996 |
| AU | 710272 B2 | 9/1996 |
| AU | 3688197 A | 3/1998 |
| AU | 76532/98 A | 12/1998 |
| AU | 83802/98 A | 1/1999 |
| AU | 24070/99 A | 9/1999 |
| AU | 0726036 B2 | 10/2000 |
| AU | 0728118 B2 | 1/2001 |
| AU | 63708/00 A | 3/2001 |
| AU | 75251/00 A | 5/2001 |
| AU | 16711/02 A | 6/2002 |
| AU | 2002236724 A1 | 8/2002 |
| AU | 2002236725 A1 | 8/2002 |
| AU | 2002243931 A1 | 8/2002 |
| AU | 2002305364 A1 | 12/2002 |
| AU | 2002305366 A1 | 12/2002 |
| AU | 0757807 B2 | 3/2003 |

(56) References Cited

FOREIGN PATENT DOCUMENTS

| | | |
|---|---|---|
| AU | 2002329470 A1 | 4/2003 |
| AU | 2002334096 A1 | 4/2003 |
| AU | 2003212352 A1 | 10/2003 |
| AU | 2003224988 A1 | 12/2003 |
| AU | 770821 B2 | 3/2004 |
| AU | 2003263907 A1 | 3/2004 |
| AU | 2003272543 A1 | 4/2004 |
| AU | 2004248203 A1 | 12/2004 |
| AU | 2005284094 A1 | 3/2006 |
| AU | 2005315602 A1 | 6/2006 |
| AU | 2005315603 A1 | 6/2006 |
| AU | 2007217434 A1 | 8/2007 |
| AU | 2008336053 A1 | 6/2009 |
| AU | 2009253152 A1 | 12/2009 |
| AU | 2010243717 A1 | 11/2011 |
| AU | 2013215413 A1 | 8/2014 |
| AU | 2013318032 A1 | 4/2015 |
| AU | 2013335072 A1 | 5/2015 |
| AU | 2014205550 A1 | 7/2015 |
| AU | 2014224780 A1 | 8/2015 |
| AU | 2014241488 A1 | 8/2015 |
| AU | 2014237231 A1 | 9/2015 |
| AU | 2014237477 A1 | 9/2015 |
| AU | 2014244399 A1 | 9/2015 |
| AU | 2014346645 A1 | 6/2016 |
| AU | 2017225117 A1 | 9/2017 |
| AU | 2017221431 A1 | 9/2018 |
| AU | 2017221464 A1 | 9/2018 |
| BR | PI0515445 A | 7/2008 |
| BR | PI0518606 A2 | 11/2008 |
| BR | PI0519038 A2 | 12/2008 |
| BR | PI0708238 A2 | 5/2011 |
| BR | PI0909580 A2 | 9/2015 |
| CA | 1055721 A | 6/1979 |
| CA | 1193467 A | 9/1985 |
| CA | 1243141 A | 10/1988 |
| CA | 1270951 A | 6/1990 |
| CA | 1321896 C | 9/1993 |
| CA | 2171586 A1 | 9/1996 |
| CA | 2214932 A1 | 3/1998 |
| CA | 2294880 A1 | 1/1999 |
| CA | 2334048 A1 | 8/2001 |
| CA | 2428036 A1 | 5/2002 |
| CA | 2434554 A1 | 8/2002 |
| CA | 2434555 A1 | 8/2002 |
| CA | 2403855 A1 | 9/2002 |
| CA | 2387080 A1 | 11/2002 |
| CA | 2439845 A1 | 12/2002 |
| CA | 2439968 A1 | 12/2002 |
| CA | 2499069 A1 | 4/2004 |
| CA | 2523953 A1 | 12/2004 |
| CA | 2541153 A1 | 4/2005 |
| CA | 2466249 A1 | 11/2005 |
| CA | 2527065 A1 | 7/2006 |
| CA | 2527472 A1 | 7/2006 |
| CA | 2594701 A1 | 7/2006 |
| CA | 2665162 A1 | 4/2008 |
| CA | 2863622 A1 | 8/2013 |
| CA | 2885229 A1 | 3/2014 |
| CA | 2889667 A1 | 5/2014 |
| CA | 2897061 A1 | 7/2014 |
| CA | 2903458 A1 | 9/2014 |
| CA | 2903466 A1 | 9/2014 |
| CA | 2900758 A1 | 10/2014 |
| CA | 2905896 A1 | 10/2014 |
| CA | 2929953 A1 | 5/2015 |
| CA | 2966528 A1 | 5/2016 |
| CA | 3014901 A1 | 8/2017 |
| CA | 3014915 A1 | 8/2017 |
| CN | 1150245 A | 5/1997 |
| CN | 1155706 A | 7/1997 |
| CN | 1088836 C | 8/2002 |
| CN | 1378643 A | 11/2002 |
| CN | 1419672 A | 5/2003 |
| CN | 1113313 C | 7/2003 |
| CN | 1476532 A | 2/2004 |
| CN | 1189726 C | 2/2005 |
| CN | 1622131 A | 6/2005 |
| CN | 1643351 A | 7/2005 |
| CN | 1666094 A | 9/2005 |
| CN | 1238709 C | 1/2006 |
| CN | 1805798 A | 7/2006 |
| CN | 1890556 A | 1/2007 |
| CN | 101023332 A | 8/2007 |
| CN | 101025744 A | 8/2007 |
| CN | 101076712 A | 11/2007 |
| CN | 101076833 A | 11/2007 |
| CN | 101137994 A | 3/2008 |
| CN | 100446033 C | 12/2008 |
| CN | 101389937 A | 3/2009 |
| CN | 100478659 C | 4/2009 |
| CN | 100498788 C | 6/2009 |
| CN | 101523194 A | 9/2009 |
| CN | 101535787 A | 9/2009 |
| CN | 101592521 A | 12/2009 |
| CN | 101617205 A | 12/2009 |
| CN | 100578523 C | 1/2010 |
| CN | 101646928 A | 2/2010 |
| CN | 101896800 A | 11/2010 |
| CN | 101957188 A | 1/2011 |
| CN | 102047086 A | 5/2011 |
| CN | 102165294 A | 8/2011 |
| CN | 102414722 A | 4/2012 |
| CN | 104011521 A | 8/2014 |
| CN | 104160253 A | 11/2014 |
| CN | 104169712 A | 11/2014 |
| CN | 104769419 A | 7/2015 |
| CN | 104838253 A | 8/2015 |
| CN | 105009152 A | 10/2015 |
| CN | 105051762 A | 11/2015 |
| CN | 105102946 A | 11/2015 |
| CN | 105103166 A | 11/2015 |
| CN | 105190292 A | 12/2015 |
| CN | 105556264 A | 5/2016 |
| CN | 105899940 A | 8/2016 |
| CN | 105934658 A | 9/2016 |
| CN | 107110708 A | 8/2017 |
| CN | 108139271 A | 6/2018 |
| CN | 108700466 A | 10/2018 |
| CN | 108700467 A | 10/2018 |
| CN | 110073184 A | 7/2019 |
| DE | 3043984 A1 | 6/1982 |
| DE | 8704679 U1 | 5/1987 |
| DE | 4420260 A1 | 12/1995 |
| DE | 19636774 A1 | 3/1998 |
| DE | 19720887 A1 | 11/1998 |
| DE | 69414323 T2 | 5/1999 |
| DE | 69424321 T2 | 10/2000 |
| DE | 10208696 A1 | 9/2002 |
| DE | 10122917 A1 | 11/2002 |
| DE | 10163596 C1 | 9/2003 |
| DE | 69629533 T2 | 6/2004 |
| DE | 10296294 T5 | 7/2004 |
| DE | 60009320 T2 | 3/2005 |
| DE | 69632499 T2 | 5/2005 |
| DE | 69925652 T2 | 3/2006 |
| DE | 102004059186 A1 | 6/2006 |
| DE | 602005015869 | 9/2009 |
| DE | 102009033098 A1 | 2/2011 |
| DE | 102015118551 A1 | 5/2017 |
| DK | 064683 A | 8/1983 |
| DK | 159405 B | 10/1990 |
| DK | 0931247 T3 | 3/2004 |
| EP | 0052790 A1 | 6/1982 |
| EP | 0087222 A2 | 8/1983 |
| EP | 0125189 A1 | 11/1984 |
| EP | 0178096 A2 | 4/1986 |
| EP | 0284811 A2 | 10/1988 |
| EP | 0547337 A1 | 6/1993 |
| EP | 0637731 A1 | 2/1995 |
| EP | 0732577 A2 | 9/1996 |
| EP | 0767362 A1 | 4/1997 |
| EP | 0822396 A1 | 2/1998 |
| EP | 0828144 A2 | 3/1998 |

(56) References Cited

FOREIGN PATENT DOCUMENTS

| | | |
|---|---|---|
| EP | 0845668 A2 | 6/1998 |
| EP | 0931247 A1 | 7/1999 |
| EP | 0932038 A1 | 7/1999 |
| EP | 0993601 A1 | 4/2000 |
| EP | 1057007 A1 | 12/2000 |
| EP | 1207386 A1 | 5/2002 |
| EP | 1214687 A1 | 6/2002 |
| EP | 1218706 A1 | 7/2002 |
| EP | 1283480 A1 | 2/2003 |
| EP | 1353156 A2 | 10/2003 |
| EP | 1368785 A2 | 12/2003 |
| EP | 1374166 A2 | 1/2004 |
| EP | 1393028 A1 | 3/2004 |
| EP | 1423207 A1 | 6/2004 |
| EP | 1436576 A2 | 7/2004 |
| EP | 1436577 A2 | 7/2004 |
| EP | 1456629 A2 | 9/2004 |
| EP | 1488202 A1 | 12/2004 |
| EP | 1512950 A1 | 3/2005 |
| EP | 1514083 A1 | 3/2005 |
| EP | 1536215 A2 | 6/2005 |
| EP | 1540313 A1 | 6/2005 |
| EP | 1596170 A1 | 11/2005 |
| EP | 1638694 A2 | 3/2006 |
| EP | 1671107 A1 | 6/2006 |
| EP | 1812887 A2 | 8/2007 |
| EP | 1814044 A1 | 8/2007 |
| EP | 1825436 A1 | 8/2007 |
| EP | 1831655 A1 | 9/2007 |
| EP | 1839035 A1 | 10/2007 |
| EP | 1851751 A2 | 11/2007 |
| EP | 1987332 A2 | 11/2008 |
| EP | 2068135 A1 | 6/2009 |
| EP | 1789763 B1 | 8/2009 |
| EP | 2089691 A1 | 8/2009 |
| EP | 2098840 A2 | 9/2009 |
| EP | 2130013 A1 | 12/2009 |
| EP | 1695293 B1 | 8/2010 |
| EP | 2223062 A1 | 9/2010 |
| EP | 2228634 A1 | 9/2010 |
| EP | 2265912 A1 | 12/2010 |
| EP | 2283332 A1 | 2/2011 |
| EP | 2331921 A1 | 6/2011 |
| EP | 2425404 A1 | 3/2012 |
| EP | 2773948 A1 | 9/2014 |
| EP | 2795273 A1 | 10/2014 |
| EP | 2810030 A1 | 12/2014 |
| EP | 2898313 A1 | 7/2015 |
| EP | 2912437 A1 | 9/2015 |
| EP | 2943779 A1 | 11/2015 |
| EP | 2965276 A1 | 1/2016 |
| EP | 2972156 A1 | 1/2016 |
| EP | 2972247 A1 | 1/2016 |
| EP | 2973247 A2 | 1/2016 |
| EP | 2973248 A2 | 1/2016 |
| EP | 3049777 A1 | 8/2016 |
| EP | 3066438 A1 | 9/2016 |
| EP | 3218682 A2 | 9/2017 |
| EP | 3368872 A1 | 9/2018 |
| EP | 3417255 A1 | 12/2018 |
| EP | 3417256 A1 | 12/2018 |
| ES | 8402936 A1 | 2/1984 |
| ES | 8702471 A1 | 12/1986 |
| ES | 2184656 T1 | 4/2003 |
| ES | 2206933 T3 | 5/2004 |
| ES | 2215700 T3 | 10/2004 |
| ES | 2217355 T3 | 11/2004 |
| ES | 2220950 T3 | 12/2004 |
| ES | 2331196 T3 | 12/2009 |
| ES | 2350184 T3 | 1/2011 |
| ES | 2467590 A1 | 6/2014 |
| FI | 830480 L | 8/1983 |
| FR | 2400696 A1 | 3/1979 |
| GB | 2115141 A | 9/1983 |
| GB | 2192455 A | 1/1988 |
| GB | 2293448 A | 3/1996 |
| GB | 2363018 A | 12/2001 |
| HK | 1199090 A1 | 6/2015 |
| HK | 1207903 A1 | 2/2016 |
| HK | 1208726 A1 | 3/2016 |
| HK | 1211364 A1 | 5/2016 |
| HK | 1212759 A1 | 6/2016 |
| HK | 1213321 A1 | 6/2016 |
| HK | 1214015 A1 | 8/2016 |
| HK | 1222911 A1 | 7/2017 |
| HK | 1223415 A1 | 7/2017 |
| IE | 830163 L | 8/1983 |
| IN | 5811DELNP2015 | 12/2005 |
| IN | 1313KOLNP2007 | 8/2007 |
| IN | 2602KOLNP2007 | 8/2007 |
| IN | 2603KOLNP2007 | 8/2007 |
| IN | 4468DELNP2009 | 8/2007 |
| IN | 252768 | 8/2007 |
| IN | 5026DELNP2005 | 12/2007 |
| IN | 282735 | 12/2007 |
| IN | 3855KOLNP2008 | 2/2009 |
| IN | 2184DELNP2009 | 6/2009 |
| IN | 2771DELNP2009 | 6/2009 |
| IN | 282780 | 6/2009 |
| IN | 3528DELNP2010 | 11/2011 |
| IN | 2456MUMNP2011 | 2/2012 |
| IN | 8024DELNP2010 | 9/2013 |
| IN | 6510DELNP2014 | 6/2015 |
| IN | 7234DELNP2015 | 1/2016 |
| IN | 7667DELNP2015 | 1/2016 |
| IN | 2140DELNP2015 | 4/2016 |
| IN | 4482CHENP2015 | 7/2016 |
| IN | 8042DELNP2015 | 7/2016 |
| IN | 8043DELNP2015 | 7/2016 |
| IN | 201617007827 | 7/2016 |
| IN | 201617015935 | 8/2016 |
| IN | 201727019086 | 8/2017 |
| IN | 201827018630 | 6/2018 |
| IN | 201817029788 | 11/2018 |
| IN | 201817029947 | 11/2018 |
| IT | 1061646 B | 4/1983 |
| JP | 51-131378 A | 11/1976 |
| JP | 52-062082 A | 5/1977 |
| JP | 58-011562 B2 | 3/1983 |
| JP | 58-148942 A | 9/1983 |
| JP | 61-085481 A | 5/1986 |
| JP | 63-153677 A | 6/1988 |
| JP | 05-196082 A | 8/1993 |
| JP | 05-071061 B2 | 10/1993 |
| JP | 05-300386 A | 11/1993 |
| JP | 06-052534 B2 | 7/1994 |
| JP | 06-224834 A | 8/1994 |
| JP | 07-050760 A | 2/1995 |
| JP | 07-080680 A | 3/1995 |
| JP | 07-080681 A | 3/1995 |
| JP | 07-102333 A | 4/1995 |
| JP | 07-150081 A | 6/1995 |
| JP | 08-145797 A | 6/1996 |
| JP | 08-247932 A | 9/1996 |
| JP | 08-297054 A | 11/1996 |
| JP | 08-313353 A | 11/1996 |
| JP | 09-134480 A | 5/1997 |
| JP | 09-150369 A | 6/1997 |
| JP | 09-202034 A | 8/1997 |
| JP | 10-026381 A | 1/1998 |
| JP | 10-044471 A | 2/1998 |
| JP | 10-101974 A | 4/1998 |
| JP | 10-310727 A | 11/1998 |
| JP | 10-324829 A | 12/1998 |
| JP | 2921365 B2 | 7/1999 |
| JP | 11-211569 A | 8/1999 |
| JP | 11-230831 A | 8/1999 |
| JP | 2000-028414 A | 1/2000 |
| JP | 2000-078489 A | 3/2000 |
| JP | 2000-515636 A | 11/2000 |
| JP | 3109336 B2 | 11/2000 |
| JP | 2001-035699 A | 2/2001 |
| JP | 2001-054409 A | 2/2001 |
| JP | 2001-221690 A | 8/2001 |

(56) References Cited

FOREIGN PATENT DOCUMENTS

| | | |
|---|---|---|
| JP | 2001-265786 A | 9/2001 |
| JP | 3234753 B2 | 12/2001 |
| JP | 2002-504680 A | 2/2002 |
| JP | 2002-080789 A | 3/2002 |
| JP | 2002-508076 A | 3/2002 |
| JP | 2002-111140 A | 4/2002 |
| JP | 2002-236850 A | 8/2002 |
| JP | 2002-259398 A | 9/2002 |
| JP | 2002-356082 A | 12/2002 |
| JP | 2003-042965 A | 2/2003 |
| JP | 2003-047342 A | 2/2003 |
| JP | 2003-506803 A | 2/2003 |
| JP | 2003-511662 A | 3/2003 |
| JP | 2003-152188 A | 5/2003 |
| JP | 2003-279413 A | 10/2003 |
| JP | 2003-294910 A | 10/2003 |
| JP | 2003-307456 A | 10/2003 |
| JP | 3469767 B2 | 11/2003 |
| JP | 2003-340008 A | 12/2003 |
| JP | 2004-514888 A | 5/2004 |
| JP | 2004-189780 A | 7/2004 |
| JP | 3555706 B2 | 8/2004 |
| JP | 2004-258854 A | 9/2004 |
| JP | 2004-532976 A | 10/2004 |
| JP | 2004-354196 A | 12/2004 |
| JP | 2005-060601 A | 3/2005 |
| JP | 3626387 B2 | 3/2005 |
| JP | 3631365 B2 | 3/2005 |
| JP | 2005-098499 A | 4/2005 |
| JP | 2005-106607 A | 4/2005 |
| JP | 2005-513477 A | 5/2005 |
| JP | 2005-157771 A | 6/2005 |
| JP | 2005-528603 A | 9/2005 |
| JP | 2005-539212 A | 12/2005 |
| JP | 2005-539236 A | 12/2005 |
| JP | 2006-012572 A | 1/2006 |
| JP | 3776492 B2 | 5/2006 |
| JP | 2006-162600 A | 6/2006 |
| JP | 2006-277555 A | 10/2006 |
| JP | 2006-309397 A | 11/2006 |
| JP | 3871887 B2 | 1/2007 |
| JP | 2007-504481 A | 3/2007 |
| JP | 2007-507722 A | 3/2007 |
| JP | 2007-516677 A | 6/2007 |
| JP | 3941569 B2 | 7/2007 |
| JP | 2007-218895 A | 8/2007 |
| JP | 3986117 B2 | 10/2007 |
| JP | 3995598 B2 | 10/2007 |
| JP | 3996677 B2 | 10/2007 |
| JP | 4024758 B2 | 12/2007 |
| JP | 4039470 B2 | 1/2008 |
| JP | 2008-122335 A | 5/2008 |
| JP | 2008-513192 A | 5/2008 |
| JP | 2008-140036 A | 6/2008 |
| JP | 2008-519296 A | 6/2008 |
| JP | 4105771 B2 | 6/2008 |
| JP | 2008-523404 A | 7/2008 |
| JP | 2008-523521 A | 7/2008 |
| JP | 2008-527381 A | 7/2008 |
| JP | 2009-094737 A | 4/2009 |
| JP | 2009-527752 A | 7/2009 |
| JP | 2009-288027 A | 12/2009 |
| JP | 4377107 B2 | 12/2009 |
| JP | 2010-506169 A | 2/2010 |
| JP | 2010-519385 A | 6/2010 |
| JP | 4500498 B2 | 7/2010 |
| JP | 4505213 B2 | 7/2010 |
| JP | 4551068 B2 | 9/2010 |
| JP | 4553990 B2 | 9/2010 |
| JP | 2010-242018 A | 10/2010 |
| JP | 2011-505567 A | 2/2011 |
| JP | 4623842 B2 | 2/2011 |
| JP | 4629554 B2 | 2/2011 |
| JP | 2011-506961 A | 3/2011 |
| JP | 4659499 B2 | 3/2011 |
| JP | 2011-075544 A | 4/2011 |
| JP | 4672667 B2 | 4/2011 |
| JP | 2011-115594 A | 6/2011 |
| JP | 2011-517783 A | 6/2011 |
| JP | 2011-522234 A | 7/2011 |
| JP | 2011-197662 A | 10/2011 |
| JP | 4827697 B2 | 11/2011 |
| JP | 2012-010232 A | 1/2012 |
| JP | 4912888 B2 | 4/2012 |
| JP | 5055829 B2 | 10/2012 |
| JP | 5063076 B2 | 10/2012 |
| JP | 2012-226763 A | 11/2012 |
| JP | 2012-243240 A | 12/2012 |
| JP | 5132428 B2 | 1/2013 |
| JP | 2013-058175 A | 3/2013 |
| JP | 5213867 B2 | 6/2013 |
| JP | 2013-150205 A | 8/2013 |
| JP | 5306519 B2 | 10/2013 |
| JP | 2013-235967 A | 11/2013 |
| JP | 5398803 B2 | 1/2014 |
| JP | 5637395 B2 | 12/2014 |
| JP | 2015-510345 A | 4/2015 |
| JP | 2015-529832 A | 10/2015 |
| JP | 2015-536458 A | 12/2015 |
| JP | 2016-503896 A | 2/2016 |
| JP | 2016-507073 A | 3/2016 |
| JP | 5897736 B2 | 3/2016 |
| JP | 2016-510112 A | 4/2016 |
| JP | 5922865 B2 | 5/2016 |
| JP | 2016-518642 A | 6/2016 |
| JP | 2016-521347 A | 7/2016 |
| JP | 2016-197129 A | 11/2016 |
| JP | 2016-535848 A | 11/2016 |
| JP | 6139702 B2 | 5/2017 |
| JP | 6142007 B2 | 6/2017 |
| JP | 6149113 B2 | 6/2017 |
| JP | 6162318 B2 | 7/2017 |
| JP | 6185072 B2 | 8/2017 |
| JP | 2017-167165 A | 9/2017 |
| JP | 6210115 B2 | 10/2017 |
| JP | 2018-500550 A | 1/2018 |
| JP | 6282345 B2 | 2/2018 |
| JP | 6293860 B2 | 3/2018 |
| JP | 6322654 B2 | 5/2018 |
| JP | 6424256 B2 | 11/2018 |
| JP | 2019-500588 A | 1/2019 |
| KR | 10-1996-0034994 A | 10/1996 |
| KR | 10-0238960 B1 | 1/2000 |
| KR | 10-2001-0020549 A | 3/2001 |
| KR | 10-0288310 B1 | 5/2001 |
| KR | 10-2001-0078213 A | 8/2001 |
| KR | 10-2002-0036856 A | 5/2002 |
| KR | 10-2002-0070146 A | 9/2002 |
| KR | 10-2002-0079985 A | 10/2002 |
| KR | 10-2003-0048158 A | 6/2003 |
| KR | 10-2003-0074818 A | 9/2003 |
| KR | 10-2004-0111405 A | 12/2004 |
| KR | 10-2005-0016483 A | 2/2005 |
| KR | 10-2005-0050544 A | 5/2005 |
| KR | 10-2005-0057387 A | 6/2005 |
| KR | 10-0593098 B1 | 6/2006 |
| KR | 10-0673343 B1 | 1/2007 |
| KR | 10-2007-0053295 A | 5/2007 |
| KR | 10-2007-0085589 A | 8/2007 |
| KR | 10-2007-0085715 A | 8/2007 |
| KR | 10-0748844 B1 | 8/2007 |
| KR | 10-0840165 B1 | 6/2008 |
| KR | 10-0864598 B1 | 10/2008 |
| KR | 10-2008-0100431 A | 11/2008 |
| KR | 10-2010-0102147 A | 9/2010 |
| KR | 10-2011-0018388 A | 2/2011 |
| KR | 10-1037821 B1 | 5/2011 |
| KR | 10-2012-0027225 A | 3/2012 |
| KR | 10-1162078 B1 | 7/2012 |
| KR | 10-2014-0119807 A | 10/2014 |
| KR | 10-2015-0060793 A | 6/2015 |
| KR | 10-2015-0074172 A | 7/2015 |
| KR | 10-2015-0092308 A | 8/2015 |
| KR | 10-2015-0119209 A | 10/2015 |

(56) References Cited

FOREIGN PATENT DOCUMENTS

| | | |
|---|---|---|
| KR | 10-2015-0119212 A | 10/2015 |
| KR | 10-2015-0119280 A | 10/2015 |
| KR | 10-2015-0119910 A | 10/2015 |
| KR | 10-1593866 B1 | 2/2016 |
| KR | 10-2016-0084433 A | 7/2016 |
| KR | 10-1671413 B1 | 11/2016 |
| KR | 10-1697036 B1 | 1/2017 |
| KR | 10-1725700 B1 | 4/2017 |
| KR | 10-1726968 B1 | 4/2017 |
| KR | 10-2017-0066615 A | 6/2017 |
| KR | 10-1747009 B1 | 6/2017 |
| KR | 10-1757090 B1 | 7/2017 |
| KR | 10-1757091 B1 | 7/2017 |
| KR | 10-2018-0074756 A | 7/2018 |
| KR | 10-1877657 B1 | 7/2018 |
| KR | 10-2018-0102653 A | 9/2018 |
| KR | 10-2018-0103133 A | 9/2018 |
| MX | PA03005145 A | 9/2003 |
| MX | PA03007411 A | 11/2003 |
| MX | PA03007412 A | 11/2003 |
| MX | PA03005124 A | 12/2003 |
| MX | PA05002879 A | 6/2005 |
| MX | PA05013266 A | 3/2006 |
| MX | PA06003823 A | 6/2006 |
| MX | 2007008504 A | 9/2007 |
| MX | 2009003465 A | 4/2009 |
| MX | 2009008865 A | 8/2009 |
| MX | 2011003310 A | 4/2011 |
| MX | 2014008967 A | 4/2015 |
| MX | 2015003443 A | 6/2015 |
| MX | 2015005320 A | 8/2015 |
| MX | 2015008787 A | 11/2015 |
| MX | 2015010597 A | 12/2015 |
| MX | 2015012257 A | 12/2015 |
| MX | 2015012499 A | 12/2015 |
| MX | 2015012847 A | 2/2016 |
| MX | 2016006018 A | 10/2016 |
| MX | 345998 B | 2/2017 |
| MX | 350209 B | 8/2017 |
| MX | 350457 B | 9/2017 |
| MX | 352821 B | 12/2017 |
| MX | 355910 B | 5/2018 |
| NO | 830330 L | 8/1983 |
| NZ | 203140 A | 3/1985 |
| NZ | 631145 A | 12/2015 |
| NZ | 631130 A | 1/2016 |
| NZ | 628184 A | 2/2016 |
| NZ | 631023 A | 4/2016 |
| NZ | 631140 A | 5/2016 |
| NZ | 630955 A | 2/2017 |
| NZ | 630948 A | 3/2017 |
| NZ | 630949 A | 4/2017 |
| NZ | 630952 A | 4/2017 |
| PL | 369147 A1 | 4/2005 |
| PT | 076264 B | 12/1985 |
| PT | 931247 E | 3/2004 |
| PT | 828144 E | 9/2004 |
| RU | 2002111565 A | 2/2004 |
| RU | 2251084 C2 | 4/2005 |
| RU | 2004131669 A | 4/2005 |
| RU | 2313071 C2 | 12/2007 |
| RU | 2007114283 A | 10/2008 |
| RU | 2007126795 A | 1/2009 |
| RU | 2007126808 A | 1/2009 |
| RU | 2382339 C2 | 2/2010 |
| RU | 2008137979 A | 3/2010 |
| RU | 2010153586 A | 7/2012 |
| RU | 2011147081 A | 6/2013 |
| RU | 2498240 C2 | 11/2013 |
| RU | 2558622 C2 | 8/2015 |
| RU | 2017120364 A | 12/2018 |
| TW | 321720 B | 12/1997 |
| TW | I225548 B | 12/2004 |
| TW | 201403036 A | 1/2014 |
| TW | 201423082 A | 6/2014 |
| TW | 201423083 A | 6/2014 |
| TW | 201439522 A | 10/2014 |
| TW | 201441856 A | 11/2014 |
| TW | 201443421 A | 11/2014 |
| TW | 201506364 A | 2/2015 |
| TW | 201510508 A | 3/2015 |
| TW | I486564 B | 6/2015 |
| TW | 201531676 A | 8/2015 |
| TW | I497052 B | 8/2015 |
| TW | I513977 B | 12/2015 |
| TW | I515590 B | 1/2016 |
| TW | I522610 B | 2/2016 |
| TW | I554746 B | 10/2016 |
| TW | I555976 B | 11/2016 |
| TW | I575230 B | 3/2017 |
| TW | I638156 B | 10/2018 |
| WO | 96/34259 A1 | 10/1996 |
| WO | 98/53285 A1 | 11/1998 |
| WO | 99/01745 A1 | 1/1999 |
| WO | 99/42815 A1 | 8/1999 |
| WO | 01/11567 A1 | 2/2001 |
| WO | 01/25737 A1 | 4/2001 |
| WO | 01/71560 A1 | 9/2001 |
| WO | 02/42750 A1 | 5/2002 |
| WO | 02/63556 A2 | 8/2002 |
| WO | 02/63557 A2 | 8/2002 |
| WO | 02/65074 A2 | 8/2002 |
| WO | 02/99367 A2 | 12/2002 |
| WO | 02/99371 A1 | 12/2002 |
| WO | 2003/020445 A1 | 3/2003 |
| WO | 03/29766 A2 | 4/2003 |
| WO | 03/29811 A1 | 4/2003 |
| WO | 03/30524 A2 | 4/2003 |
| WO | 03/54529 A2 | 7/2003 |
| WO | 2003/083420 A1 | 10/2003 |
| WO | 2003/102521 A1 | 12/2003 |
| WO | 2004/022247 A1 | 3/2004 |
| WO | 2004/027401 A1 | 4/2004 |
| WO | 2004/111289 A2 | 12/2004 |
| WO | 2005/036142 A1 | 4/2005 |
| WO | 2005/059841 A1 | 6/2005 |
| WO | 2006/030028 A1 | 3/2006 |
| WO | 2006/052561 A2 | 5/2006 |
| WO | 2006/064010 A1 | 6/2006 |
| WO | 2006/064011 A1 | 6/2006 |
| WO | 2006/076211 A2 | 7/2006 |
| WO | 2006/076635 A1 | 7/2006 |
| WO | 2007/096402 A2 | 8/2007 |
| WO | 2008/042394 A1 | 4/2008 |
| WO | 2008/059649 A1 | 5/2008 |
| WO | 2008/103405 A1 | 8/2008 |
| WO | 2009/071152 A1 | 6/2009 |
| WO | 2009/075728 A1 | 6/2009 |
| WO | 2009/128873 A1 | 10/2009 |
| WO | 2009/144222 A1 | 12/2009 |
| WO | 2010/036874 A1 | 4/2010 |
| WO | 2010/125023 A1 | 11/2010 |
| WO | 2013/035428 A1 | 3/2013 |
| WO | 2013/049796 A1 | 4/2013 |
| WO | 2013/067204 A1 | 5/2013 |
| WO | 2013/081812 A1 | 6/2013 |
| WO | 2013/092677 A1 | 6/2013 |
| WO | 2013/092678 A1 | 6/2013 |
| WO | 2013/116192 A1 | 8/2013 |
| WO | 2014/047296 A1 | 3/2014 |
| WO | 2014/066045 A1 | 5/2014 |
| WO | 2014/072563 A1 | 5/2014 |
| WO | 2014/110087 A1 | 7/2014 |
| WO | 2014/135503 A1 | 9/2014 |
| WO | 2014/150142 A2 | 9/2014 |
| WO | 2014/150337 A2 | 9/2014 |
| WO | 2014/158959 A1 | 10/2014 |
| WO | 2014/159810 A1 | 10/2014 |
| WO | 2015/044064 A1 | 4/2015 |
| WO | 2015/070005 A1 | 5/2015 |
| WO | 2015/072223 A1 | 5/2015 |
| WO | 2016/074801 A2 | 5/2016 |
| WO | 2017/071824 A1 | 5/2017 |
| WO | 2017/143165 A1 | 8/2017 |

(56) References Cited

FOREIGN PATENT DOCUMENTS

| WO | 2017/143278 A1 | 8/2017 | |
|---|---|---|---|
| WO | WO-2018041727 A1 * | 3/2018 | .............. G01J 3/463 |
| ZA | 200408713 | 6/2006 | |

OTHER PUBLICATIONS

Ferrero, Alejandro, et al. "Definition of a measurement scale of graininess from reflectance and visual measurements." Optics express 26.23 (2018): 30116-30127. (Year: 2018).*
Perales, Esther, et al. "Graininess characterization by multidimensional scaling." Journal of Modern Optics 66.9 (2019): 929-938. ( Year: 2019).*
Perales, Esther, et al. "Evaluating the Graininess Attribute by Visual Scaling for Coatings with Special-Effect Pigments." Coatings 10.4 (2020): 316. (Year: 2020).*
International Search Report and Written Opinion received for PCT Application Serial No. PCT/US2020/051487 dated Nov. 17, 2020, 10 pages.
U.S. Appl. No. 60/172,473, filed Dec. 16, 1999, Victor G. Corrigan et al.
U.S. Appl. No. 60/395,873, filed Jul. 11, 2002, Thomas J. Skierski.
U.S. Appl. No. 60/428,539, filed Nov. 20, 2002, Thomas J, et al.
U.S. Appl. No. 60/477,875, filed Dec. 1, 2003, Arun et al.
U.S. Appl. No. 61/702,959, filed Sep. 18, 2012, Paul Beymore.
U.S. Appl. No. 61/718,729, filed Oct. 25, 2012, Alison M. et al.
U.S. Appl. No. 61/901,493, filed Nov. 7, 2013, Alison M. Norris.
U.S. Appl. No. 61/901,483, filed Nov. 7, 2013, Alison et al.
Amookht et al., "Effect of surface texture on color appearance of metallic coatings", Progress in Organic Coatings, vol. 77, No. 7, 1221-1225, 2014, pp. 1221-1225.
Chorro et al., "The minimum number of measurements for colour, sparkle , and graininesscharacterisation in gonio-apparent panels", Coloration Technology, vol. 131, Issue 4, 2015, pp. 303-309.
Couka et al., "A mixed boolean and deposit model for the modeling of Metal pigments inpaint layers", Image Analysis & Stereology, vol. 34, No. 2, 2015, pp. 125-134.
Filip et al., "Optical analysis of coatings including diffractive pigments using ahigh-resolution gonioreflectometer", Journal of Coatings Technology and Research, ISSN:1935-3804, DOI:10.1007/s1199.8-018-0137-5, 2018.
Gao et al., "Failure analysis of anti corrosive coating of oil pipeline", Fushi Kexue Yu Fanghu Jishu, vol. 25, Issue 1, 2013, pp. 82-84.
Gohil et al., "Designing polymeric films having specific metallic luster", Journal of Applied Polymer Science, vol. 125, Issue 1, 2012, pp. 327-338.
Hashizume et al., "Recent developments in aluminum pigments for metallic effect coating", Shikizai Kyokaishi, vol. 83, No. 4, 2010, pp. 164-170.
Huang et al., "Assessing appearance and emotional attributes of coloured metallicpaints", Coloration Technology, vol. 134, No. 1, 2018, pp. 59-70.
Medina et al., "Fractal dimension of sparkles in automotive metallic coatings bymultispectral imaging measurements", ACS Applied Materials & Interfaces, vol. 6, No. 14, 2014, pp. 11439-11447.
Nagae et al., "Color measurement technology in metallic coating", Toso Gijutsu, vol. 49, Issue 5, 2010, pp. 54-58.
Nagae et al., "New color measurement device for metallic coatings", Toso Gijutsu, 2009, vol. 48, Issue 7, 2009, pp. 104-107.
Rentschler et al., "A trip into the blue. Measuring and making sparkles with effectpigments", Farbe + Lack, vol. 118, Issue 1, 2012, pp. 29-32.
Rentschler et al., "Measuring sparkling blues without blues determining colouristic properties and particle orientation in blue effect coatings", European Coatings Journal, Issue 12, 2011, pp. 78-83.
Roberts et al., "New measurements system for characterizing the total color impression of effect coatings", Annual Technical Conference—Society of Plastics Engineers, vol. 66, 2008, pp. 1162-1166.
Terada et al., "Evaluation of the distribution of aluminum flakes in the metallic basecoat using a texture analysis method by two dimensional Fourier transform", Shikizai Kyokaishi, vol. 77, No. 1, 2004, pp. 7-12.
Office Action received for Chinese Patent Application No. 202080066099.9, mailed on May 18, 2024, 23 pages (14 pages of English Translation and 9 pages of Original Document).

* cited by examiner

SYSTEMS AND METHODS FOR MAPPING COATINGS TO A SPATIAL APPEARANCE SPACE

CROSS-REFERENCE TO RELATED APPLICATIONS

This application claims the benefit of and priority to U.S. Provisional Patent Application Ser. No. 62/902,520 filed on 19 Sep. 2019 and entitled "SYSTEMS AND METHODS FOR MAPPING COATINGS TO A SPATIAL APPEARANCE SPACE," which application is expressly incorporated herein by reference in its entirety.

TECHNICAL FIELD

The present invention relates to computer-implemented methods and systems for aiding in identifying matching coatings to a target coating, particularly by mapping coatings to a spatial appearance space, and related computer program products.

BACKGROUND

Modern coatings provide several important functions in industry and society. Coatings can protect a coated material from corrosion, such as rust. Coatings can also provide an aesthetic function by providing a particular color and/or spatial appearance to an object. For example, most automobiles are coated using paints and various other coatings in order to protect the metal body of the automobile from the elements and also to provide aesthetic visual effects.

In view of the wide-ranging uses for different coatings, it is often necessary to identify a target coating composition. For instance, it might be necessary to identify a target coating on an automobile that has been in an accident. If the target coating is not properly identified, any resulting repair to the automobile's coating will not match the original coating. As used herein, a target coating comprises any coating of interest that has been applied to any physical object.

There are many opportunities for new methods and systems that improve the identification of coatings.

BRIEF SUMMARY OF THE INVENTION

The present invention relates to a computerized method for use on a computer system comprising one or more processors and one or more computer-readable media having stored thereon executable instructions that when executed by the one or more processors configure the computer system to perform a method for mapping coatings to a spatial appearance space. The computerized method comprises receiving a plurality of coating spatial appearance variables of a target coating from a coating-measurement instrument. The plurality of coating spatial appearance variables comprises a graininess variable, a sparkle area variable, and a sparkle intensity variable. The computerized method also comprises generating target spatial appearance space coordinates for the target coating by mapping each of the plurality of coating spatial appearance variables to an individual axis in a multidimensional coordinate system. The graininess variable is mapped to a first axis of the multidimensional coordinate system. The sparkle area variable is mapped to a second axis of the multidimensional coordinate system. Additionally, the sparkle intensity variable is mapped to a third axis of the multidimensional coordinate system. The computerized method comprises accessing a database of spatial appearance space coordinates. The database comprises multiple unique spatial appearance space coordinates in the multidimensional coordinate system associated with different reference coatings. Additionally, the computerized method comprises identifying spatial appearance space coordinates associated with a plurality of potentially matching reference coatings from the database of spatial appearance space coordinates. The computerized method further comprises calculating a spatial-appearance-space distance between the identified spatial appearance space coordinates associated with the potentially matching reference coatings and the spatial appearance space coordinates of the target coating for each of said potentially matching reference coatings. Further still, the method comprises identifying particular spatial appearance space coordinates from the identified spatial appearance space coordinates associated with the plurality of potentially matching reference coatings that are associated with a smallest spatial-appearance-space distance from the spatial appearance space coordinates of the target coating. The method also comprises displaying a visual interface element indicating a particular reference coating that is associated with the particular spatial appearance space coordinates as a proposed spatial appearance match to the target coating.

The present invention also relates to computer systems and computerized methods for mapping coatings to a spatial appearance space, and related computer program products as specified in the appended independent claims. According to the present invention, a computer system for mapping coatings to a spatial appearance space is provided, which comprises one or more processors and one or more computer-readable media having stored thereon executable instructions that when executed by the one or more processors configure the computer system to perform various acts. The computer system is configured to receive a plurality of coating spatial appearance variables of a target coating from a coating-measurement instrument. The one or more coating spatial appearance variables comprise a graininess variable, a sparkle area variable, and a sparkle intensity variable. The computer system is also configured to generate spatial appearance space coordinates for the target coating by mapping each of the one or more coating spatial appearance variables to an individual axis of a multidimensional coordinate system. The graininess variable is mapped to a first axis of the multidimensional coordinate system, the sparkle area variable is mapped to a second axis of the multidimensional coordinate system, and the sparkle intensity variable is mapped to a third axis of the multidimensional coordinate system. The computer system accesses a database of spatial appearance space coordinates. The database comprises multiple unique spatial appearance space coordinates in said multidimensional coordinate system associated with different reference coatings. The computer system also identifies spatial appearance space coordinates associated with a plurality of potentially matching reference coatings from the database of spatial appearance space coordinates. In addition, the computer system calculates a spatial-appearance-space distance between the one identified spatial appearance space coordinates associated with the potentially matching reference coatings and the spatial appearance space coordinates of the target coating for each of said potentially matching reference coatings. Further, the computer system identifies particular spatial appearance space coordinates from the identified spatial appearance space coordinates associated with the potentially matching reference coatings that are associated with the smallest spatial-appearancespace distance from the spatial appearance space coordinates of the target coating. Further still, the computer system displays a visual interface element indicating a particular reference coating that is associated with the particular spatial appearance space coordinates as a proposed spatial appearance match to the target coating.

Additionally, the present invention also comprises a computer program product comprising one or more computer storage media having stored thereon computer-executable instructions that, when executed at a processor, cause the computer system to perform a method for mapping coatings to a spatial appearance space. The computer system receives a plurality of coating spatial appearance variables of a target coating from a coating-measurement instrument. The one or more coating spatial appearance variables comprise a graininess variable, a sparkle area variable, and a sparkle intensity variable. The computer system also generates spatial appearance space coordinates for the target coating by mapping each of the one or more coating spatial appearance variables to an individual axis of a multidimensional coordinate system. The graininess variable is mapped to a first axis of the multidimensional coordinate system, the sparkle area variable is mapped to a second axis of the multidimensional coordinate system, and the sparkle intensity variable is mapped to a third axis of the multidimensional coordinate system. The computer system accesses a database of spatial appearance space coordinates. The database comprises multiple unique spatial appearance space coordinates in said multidimensional coordinate system associated with different reference coatings. The computer system also identifies spatial appearance space coordinates associated with a plurality of potentially matching reference coatings from the database of spatial appearance space coordinates. In addition, the computer system calculates a spatial-appearance-space distance between the one identified spatial appearance space coordinates associated with the potentially matching reference coatings and the spatial appearance space coordinates of the target coating for each of said potentially matching reference coatings. Further, the computer system identifies particular spatial appearance space coordinates from the identified spatial appearance space coordinates associated with the potentially matching reference coatings that are associated with the smallest spatial-appearance-space distance from the spatial appearance space coordinates of the target coating. Further still, the computer system displays a visual interface element indicating a particular reference coating that is associated with the particular spatial appearance space coordinates as a proposed spatial appearance match to the target coating.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific examples thereof, which are illustrated in the appended drawings. Understanding that these drawings depict only examples of the invention and are not therefore to be considered to be limiting of its scope, the invention will be described and explained with additional specificity and detail through the use of the accompanying drawings introduced below.

DETAILED DESCRIPTION

Figure 1:
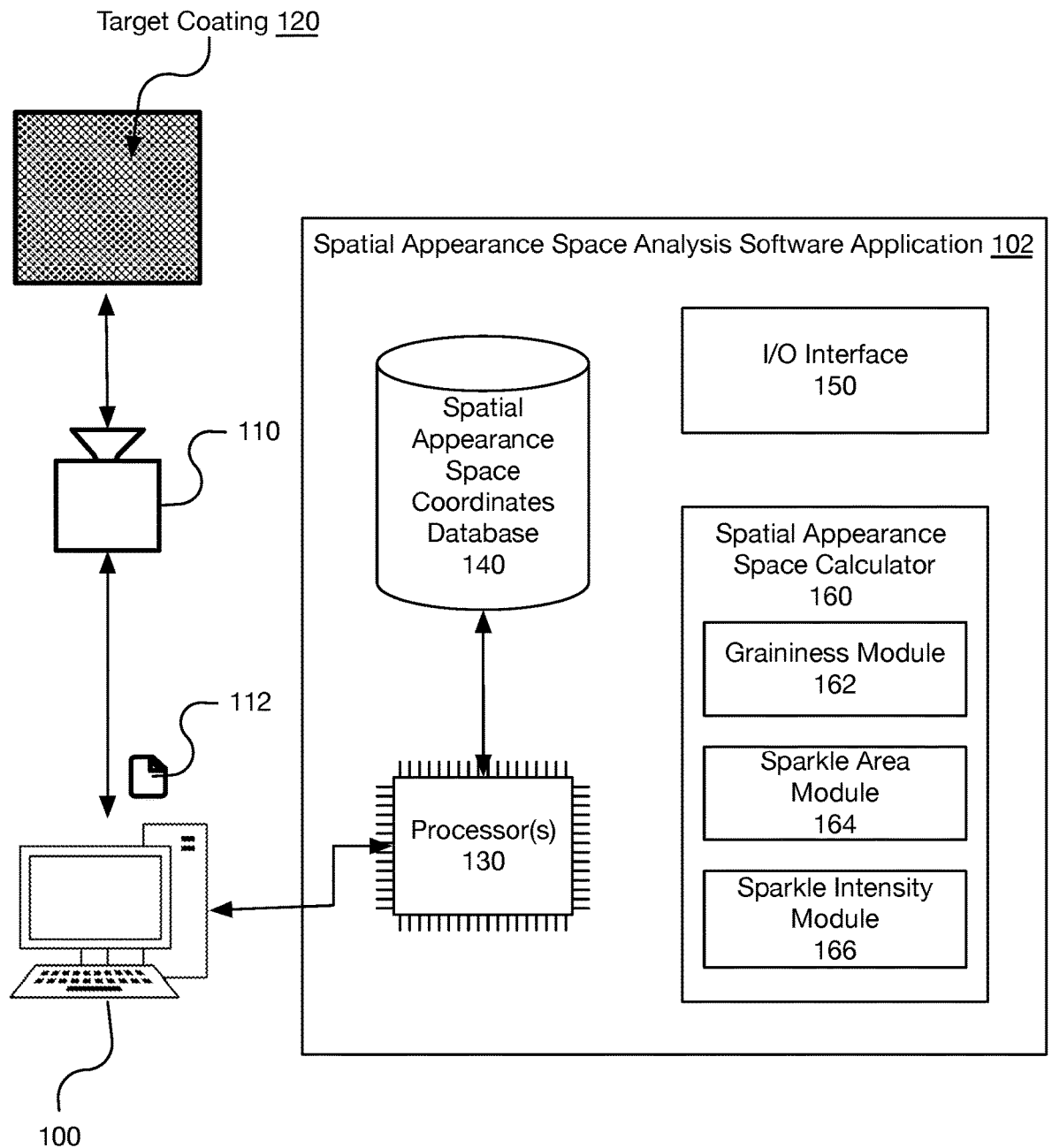
FIG. 1 depicts a schematic diagram of an exemplary computer system according to the present invention for mapping target coatings to a spatial appearance space.

The present invention extends to systems, methods, and apparatus for mapping target coatings to a spatial appearance space. As used herein, a target coating comprises any coating of interest. Additionally, as used herein "spatial appearance" is defined to mean those attributes of appearance that have a spatial component including texture, graininess, sparkle, etc. One will appreciate that coating color does not contribute to spatial appearance. Further, "texture" is defined to mean the visible structure depending on the size and organization of small constituent parts of a material; typically, the subsurface structure of a gonioapparent material. Typical texture components within coatings comprise aluminum flakes, mica, or other effect components.

The spatial appearance space disclosed herein may provide several benefits to the field of coating identification and matching. For example, conventional identification of spatial appearance components within a coating involves a wide range of different methods and systems that are typically mutually exclusive to each other. For many users, this results in a "black box" system where the user enters data into a system and the system, without any transparency or understanding from the user, generates spatial appearance information, which may include proposed matching coatings.

This lack of uniformity creates confusion and challenges within the technical space because the outputs of many of these spatial appearance processing systems are not immediately useful outside the system. For instance, a first manufacturer may generate spatial appearance data using the manufacturer's proprietary methods and outputs. A second manufacturer may do the same, while using different methods and different outputs. This creates significant technical burdens when users wish to utilize spatial appearance data within their own systems for further processing. Due to the lack of uniformity, the user is often required to create custom solutions for each and every manufacturer. Further, these custom solutions must often be created without the benefit of understanding how the outputs are calculated.

In contrast to these conventional systems, the present invention provides a novel and inventive system to analyzing spatial appearances of coatings and mapping the spatial appearance of the coatings to a common spatial appearance space. Such a mapping allows for more efficient processing in that all spatial appearance components can be commonly mapped to the same space. Such a mapping also allows for the easy use of outputted data. In particular, since a common coordinate system can be used to describe different coatings, further processing can be performed on a coordinate basis for all of the different coatings.

Accordingly, a computer system of the disclosed invention is configured to process data from a target coating. The target coating is analyzed using one or more tools known in the art to derive spatial appearance data, such as texture data. The tools may comprise spectrophotometers, cameras, and/or other devices used to extract spatial appearance data from a coating. For example, tools such as BykGardner's BykMac and X-Rite's MA98 may be used to analyze the target coating. Using novel means disclosed herein, the spatial appearance data is processed in order to identify attributes relating to the spatial appearance data and/or to identify one or more reference coatings that also comprise the same or similar spatial appearance data. As disclosed more fully herein, the processing of the spatial appearance data may occur with significant improvements in efficiency and accuracy due to the methods and systems disclosed herein.

For example, FIG. 1 depicts a schematic diagram of an exemplary computer system 100 for mapping target coatings to a spatial appearance space. The computer system 100 comprises one or more processors 130 and one or more computer-readable media having stored thereon executable instructions for a spatial appearance space analysis software application 102 that when executed by the one or more processors 130 configure the computer system 100 to perform various acts. For instance, the computer system 100 may receive one or more coating spatial appearance variables 112 of a target coating 120 from a coating-measurement instrument 110, such as a spectrophotometer.

For example, the one or more coating spatial appearance variables 112 comprise a graininess variable, a sparkle area variable, and a sparkle intensity variable. As used herein, the graininess variable comprises an identified contrast of the light/dark irregular patterns exhibited by the target coating when viewed under illumination. The illumination may be directional or diffuse and may be determined by the device taking the measurements or by the spatial appearance space analysis software application 102. The graininess variable may be calculated by first identifying light/dark patterns in an image of the target coating using conventional image processing techniques. A contrast number may then be calculated based upon the contrast of the light/dark irregular patterns within respect to the rest of the coating.

The sparkle area variable comprises an area segment of spots that are more than a threshold level brighter than their immediate surroundings on an illuminated portion of the target coating. For instance, the spots may initially be identified using the threshold level of relative brightness. Once identified, the area of the identified spots can be calculated. In some cases, the area of the identified spots may be normalized with respect to the total analyzed area of the target coating 120.

The sparkle intensity variable comprises a contrast between appearance highlights on particles of a gonioapparent pigment and the particles' immediate surroundings. For instance, a threshold may be used to identify highlights on particles of a gonioapparent pigment. The threshold may be based upon a predetermined intensity rating and/or by a relative brightness of the highlights with respect to the coating. Once identified, a contrast between the highlights and the immediately surrounding particles can be calculated on a per pixel basis within an image of the target coating 120.

The graininess variable may comprise graininess measurements taken at multiple angles by the coating-measurement instrument 110. One of skill in the art will appreciate that many conventional spectrophotometers comprise detectors and/or illuminators positioned at multiple pre-determined angles. As such, spectrophotometric data received from a spectrophotometer may comprise measurements (including directional graininess measurements) taken at multiple angles. Similarly, the sparkle area variable may comprise sparkle area measurements taken at the multiple angles by the coating-measurement instrument 110. Likewise, the sparkle intensity variable may comprise sparkle intensity measurements taken at the multiple angles by the coating-measurement instrument.

Once the one or more coating spatial appearance variables 112 are gathered, a spatial appearance space calculator 160 generates target spatial appearance space coordinates for the target coating by mapping the coating spatial appearance variables to the different axes of a multidimensional coordinate system. Herein, each type of coating spatial appearance variable is generally mapped on an individual axis of the multidimensional coordinate system. In particular, a graininess module 162 maps the graininess variable to a first axis of the multidimensional coordinate system, a sparkle area module 164 maps the sparkle area variable to a second axis of the multidimensional coordinate system, and a sparkle intensity module 166 maps the sparkle intensity variable to a third axis of the multidimensional coordinate system.

The unique combination of graininess, sparkle area, and sparkle intensity provides a unique and accurate insight into the spatial appearance components of a coating. Additionally, the disclosed combination of graininess, sparkle area, and sparkle intensity provide a highly efficient condensing of data into mathematically efficient coordinates. These spatial appearance components can be mapped to a n-dimensional axis. This spatial mapping of the spatial appearance components provides for a computationally efficient means of comparing different spatial appearance characteristics in different coatings. For instance, different coatings with spatial appearance space coordinates that map closely to each other are more similar to each other than those with spatial appearance space coordinates that map further away from each other.

Figure 2:
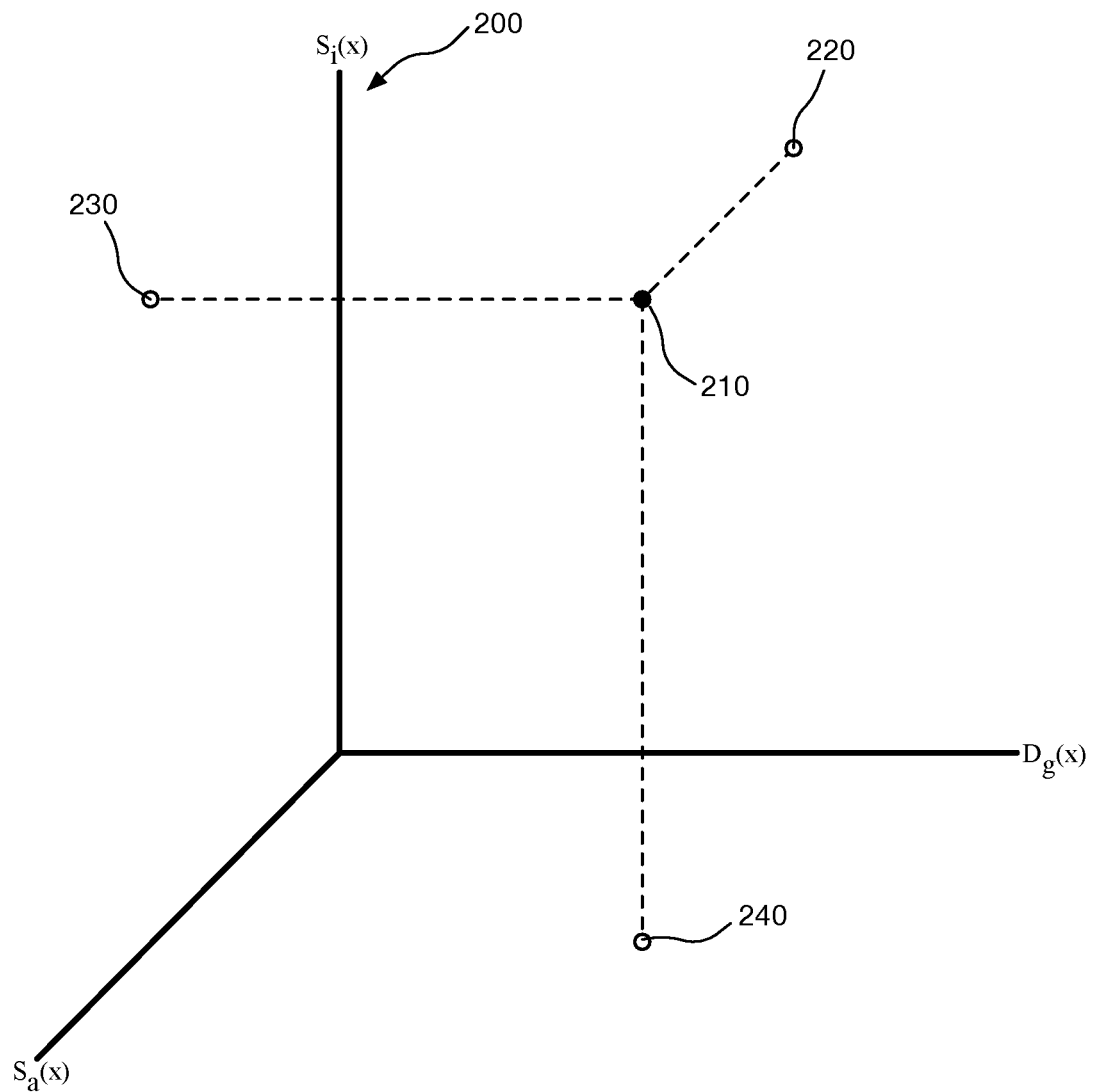
FIG. 2 depicts a three-dimensional coordinate system with exemplary spatial appearance space coordinates for a coating.

For example, FIG. 2 depicts a three-dimensional coordinate system 200 with an example of a spatial appearance space coordinates 210 for a coating. In the depicted three-dimensional coordinate system 200, $S_a(x)$ represents the sparkle area axis, $S_i(x)$ represents the sparkle intensity axis, and $D_g(x)$ represents the graininess axis. Planar point 220 depicts the two-dimensional intersection between the sparkle intensity variable and the graininess variable. Planar point 230 depicts the two-dimensional intersection between the sparkle intensity variable and the sparkle area variable. Planar point 240 depicts the two-dimensional intersection between the graininess variable and the sparkle area variable.

The spatial appearance space coordinates of the target coating 120 represents a mapping of the spatial appearance information from the target coating 120 to a three-dimensional space. One will appreciate that additional spatial appearance variables could be added to the mapping such that an n-dimensional mapping occurs. Such a mapping provides unique information relating to the attributes of the coating. The unique information is also readily processed using simple distance-based geometric equations, which provide significant computational benefits over conventional methods of spatial appearance analysis. As used herein, a texture space may be a subset of spatial appearance space. As such, a texture space may be generated using the methods and systems described herein.

For example, when analyzing the target coating 120, the coating-measurement instrument 110 may generate any number of different variables. In some instances, the different variables may need to undergo some initial processing by the one or more processors 130 in order to calculate the graininess, sparkle area, or sparkle intensity. Further, in some instances, the different spatial appearance variables may be normalized on a per-instrument basis. One will appreciate that many different coating-measurement instruments 110 output data that is not to a single common scale. As such, this data can be normalized such that each data outputted by each instrument is normalized based upon a maximum possible output value for each spatial appearance variable. As such, the resulting spatial appearance data would be between zero and one. This normalized data can then be used to generate spatial appearance coordinates. Such a system of normalizing the output provides the technical benefit of allowing multiple different devices to communicate within a common spatial appearance space.

In addition to generating spatial appearance space coordinates for the target coating 120, the one or more processors 130 may access a database of spatial appearance space coordinates 140 that comprises multiple unique spatial appearance space coordinates associated with different reference coatings. The multiple unique spatial appearance space coordinates may be based upon different known coatings. For instance, an entire library, product line, or brand catalogue of coatings may be analyzed and added to the database of spatial appearance space coordinates 140.

The one or more processors may identify spatial appearance space coordinates associated with a plurality of potentially matching reference coatings from the database of spatial appearance space coordinates. The identified spatial appearance space coordinates may comprise any subset of the spatial appearance space coordinates within the database. For example, the identified spatial appearance space coordinates may comprise every set of spatial appearance space coordinates within the database. Additionally or alternatively, the one or more processors may filter the spatial appearance space coordinates within the database, such that the identified spatial appearance space coordinates are associated with potentially matching reference coatings that comprise the same color, same effect texture types, or some other similar attributes to the target coating. Additionally or alternatively, the one or more processors may identify the spatial appearance space coordinates associated with the plurality of potentially matching reference coatings by selecting the spatial appearance space coordinates, from the database of spatial appearance space coordinates, that appear within the same orthant as the target coating's spatial appearance space coordinates. The identified spatial appearance space coordinates may also, for example, be selected based upon being within a threshold distance to the target coating's spatial appearance space coordinates.

Figure 3:
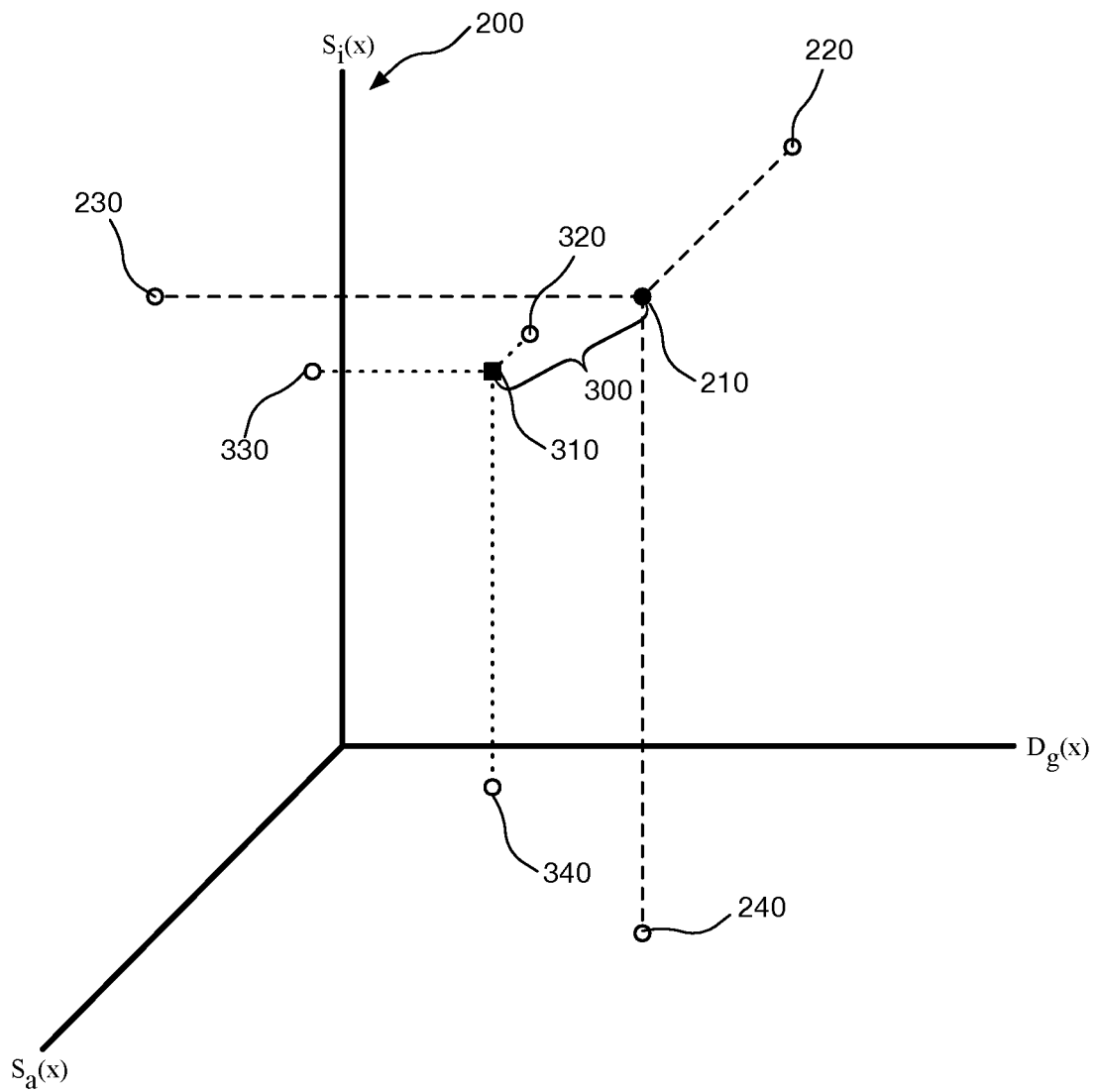
FIG. 3 depicts a three-dimensional coordinate system with an example of two different spatial appearance space coordinates for two different coatings.

After identifying the spatial appearance space coordinates associated with one or more reference coatings from the database, the one or more processors 130 may calculate a spatial-appearance-space distance between each of the identified spatial appearance space coordinates and the target spatial appearance space coordinates 210. For example, FIG. 3 depicts a three-dimensional coordinate system with an example of two different spatial appearance space coordinates 210, 310 for two different coatings. The spatial appearance space coordinate 210 for the target coating is depicted with another spatial appearance space coordinate 310 for a reference coating. Planar point 320 depicts the two-dimensional intersection between the sparkle intensity variable and the graininess variable. Planar point 330 depicts the two-dimensional intersection between the sparkle intensity variable and the sparkle area variable. Planar point 340 depicts the two-dimensional intersection between the graininess variable and the sparkle area variable.

The spatial-appearance-space distance 300 can be calculated using any number of different distance equations. For example, the below equation may be used to calculate spatial-appearance-space distance 300.

$$d = \sqrt{(x_2-x_1)^2 + (y_2-y_1)^2 + (z_2-z_1)^2}$$

The distance equation may be normalized to the values of each component within the target coating spatial appearance coordinate 210. Additionally, the distance between each planar point pair (220 and 320, 230 and 330, 240 and 340) may also be calculated.

Figure 4:
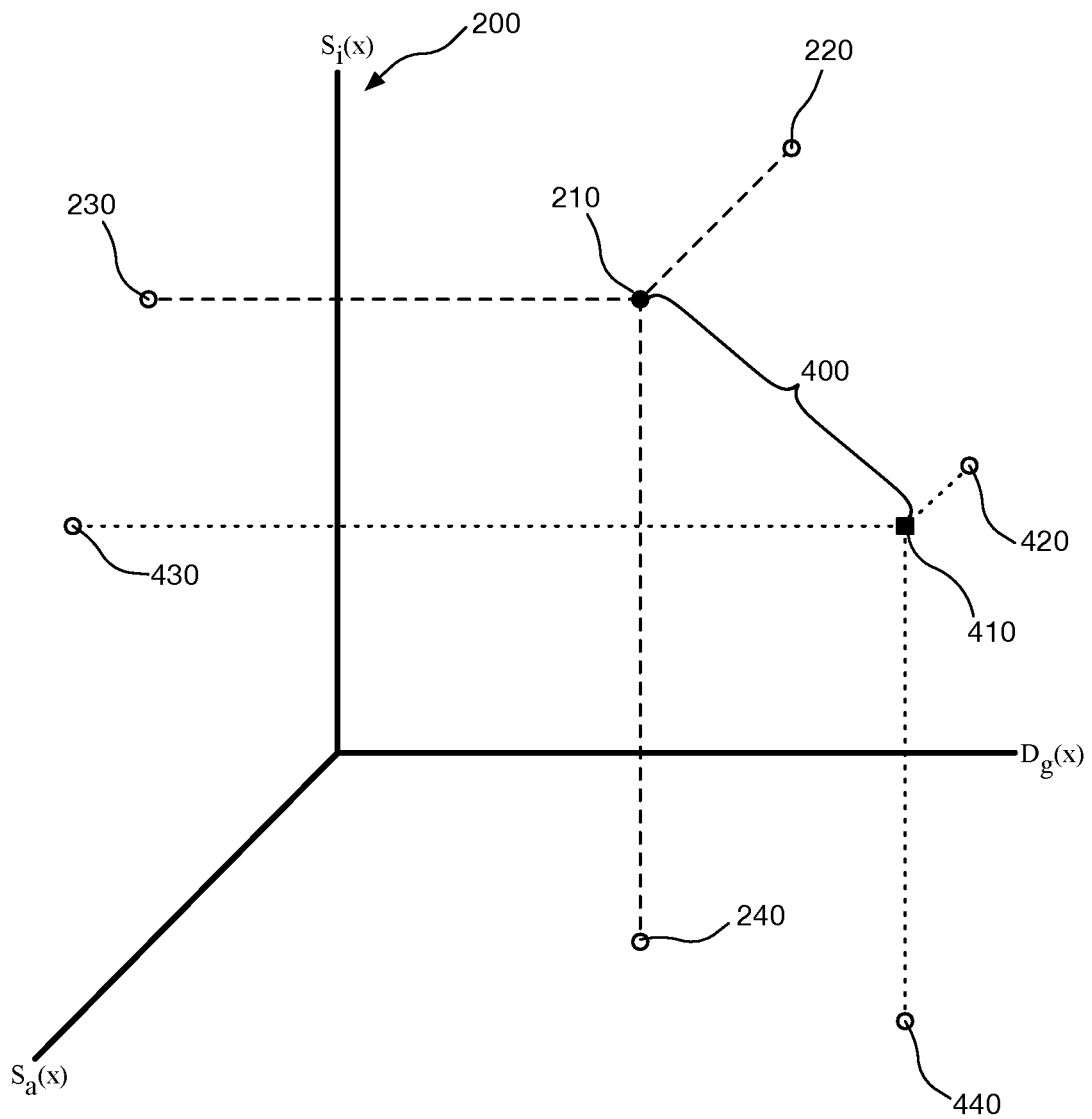
FIG. 4 depicts a three-dimensional coordinate system with another example of two different spatial appearance space coordinates for two different coatings.

FIG. 4 also depicts a three-dimensional coordinate system with another example of two different spatial appearance space coordinates 210, 410 for two different coatings. The spatial appearance space coordinate 210 for the target coating is depicted with yet another spatial appearance space coordinate 410 for another reference coating. Planar point 420 depicts the two-dimensional intersection between the sparkle intensity variable and the graininess variable. Planar point 430 depicts the two-dimensional intersection between the sparkle intensity variable and the sparkle area variable. Planar point 440 depicts the two-dimensional intersection between the graininess variable and the sparkle area variable. The one or more processors 130 calculate spatial-appearance-space distance 400.

As discussed above, the coating-measurement instrument 110 may gather the coating spatial appearance variables from multiple different angles. The spatial appearance space calculator 160 can then map, on a per angle basis from the multiple angles, each graininess measurement from the graininess variable, each sparkle area measurement from the sparkle area variable, and each sparkle intensity measurement from the sparkle intensity variable to the multidimensional coordinate system. As such, the one or more target spatial appearance space coordinates for a target coating 120 may comprise multiple per angle coordinates.

The one or more processors 130 can calculate one or more distances between the spatial appearance space coordinates for a specific coating selected from the one or more reference coatings and the target spatial appearance space coordinates for the target coating 120 on a per angle basis. Each of the spatial appearance space coordinates for the specific coating and each of the target spatial appearance space coordinates for the target coating can be associated with a predetermined set of angles, such that the one or more distances comprise calculated distances between the target spatial appearance space coordinates for the target coating and the spatial appearance space coordinates for the specific coating on a per angle basis for each angle within the predetermined set of angles. The one or more processors 130 can then generate the spatial-appearance-space distance between the target coating 120 and the specific coating by calculating a sum of squares of the plurality of determined distances.

The one or more processors 130 then identifies particular spatial appearance space coordinates from the identified spatial appearance space coordinates 310, 410 associated with the reference coatings that are associated with the smallest spatial-appearance-space distance 300, 400 from the target spatial appearance space coordinates 210. For instance, spatial-appearance-space distance 300 in FIG. 3 is smaller than spatial-appearance-space distance 400 in FIG. 4. As such, the one or more processors 130 identify spatial appearance space coordinate 300 as being the spatial appearance space coordinates that are associated with a proposed reference coating for matching the target coating 120.

The computer system 100 may also receive one or more coating color variables of the target coating 120 from the coating-measurement instrument 110. The coating color variables may comprise spectral data, LAB data, or any other data indicating the color of the target coating 120. The one or more processors 130 may identify a color associated with the target coating 120. The one or more processors 130 may also receive a coating color variable in the form of a color code that is associated with the target coating 120. For instance, the target coating 120 may be on a car panel. The car may be associated with a color code that indicates the color of the paint. The one or more processors 130 may then identify spatial appearance space coordinates from a subset of one or more coatings that are associated with the color code. As such, the one or more processors 130 can identify the one or more proposed coatings based upon the spatial-appearance-space distance between each of the identified spatial appearance space coordinates associated with the potentially matching reference coatings in the database and the target spatial appearance space coordinates and at least one other coating attribute, such as color, associated with the target coating 120.

The I/O interface 150 then displays a visual interface element indicating a particular reference coating that is associated with the particular spatial appearance space coordinates as a proposed spatial appearance match to the target coating. As indicated above the particular spatial appearance space coordinates are associated with the smallest spatial-appearance-space distance from the spatial appearance space coordinates of the target coating. The visual interface element may comprise a visual representation of the spatial appearance space coordinates for the target coating 120. The one or more processors 130 may also create a formulation for the particular reference coating (also referred to herein as the "proposed coating") based upon the formulation stored within the database of spatial appearance space coordinates. The formulation may be communicated to a coating production machine for the physical creation and mixing for the coating.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
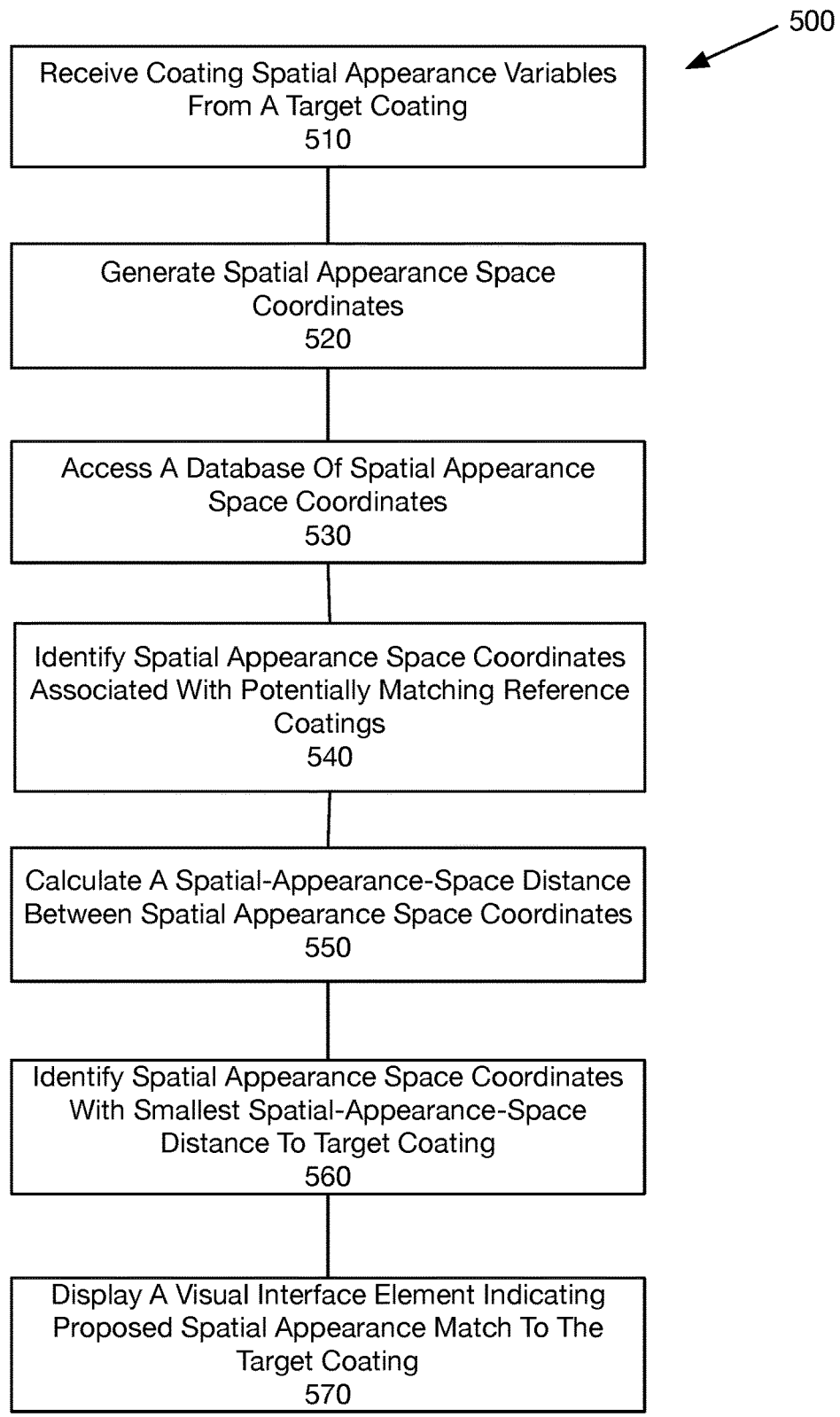
FIG. 5 depicts a flowchart of steps in an exemplary method for mapping target coatings to a spatial appearance space in accordance with the present invention.

FIG. 5 depicts a flowchart of steps in an exemplary method 500 for mapping coatings to a spatial appearance space. The method 500 comprises an act 510 of receiving coating spatial appearance variables from a target coating. Act 510 includes receiving coating spatial appearance variables of a target coating 120 from a coating-measurement instrument 110, wherein the coating spatial appearance variables comprise a graininess variable, a sparkle area variable, and a sparkle intensity variable. For instance, as depicted and described with respect to FIG. 1, the coating-measurement instrument 110 receives coating spatial appearance variables from the target coating 120. The spatial appearance variables are sent to the computer system 100 for further processing.

Additionally, method 500 comprises an act 520 of generating spatial appearance space coordinates. Act 520 includes generating target spatial appearance space coordinates for the target coating by mapping the coating spatial appearance variables to the different axes of a multidimensional coordinate system. Specifically, the graininess variable is mapped to a first axis of the multidimensional coordinate system, the sparkle area variable is mapped to a second axis of the multidimensional coordinate system, and the sparkle intensity variable is mapped to a third axis of the multidimensional coordinate system. For example, as depicted and described with respect to FIGS. 1 and 2 the spatial appearance space calculator 160 calculates coordinates within a spatial appearance space for the target coating 120 spatial appearance variables. The spatial appearance space calculator 160 may comprise a software module within the spatial appearance space analysis software application 102. The spatial appearance space calculator comprises a graininess module 162, a sparkle area module, and a sparkle intensity module 166.

Method 500 also comprises an act 530 of accessing a database of spatial appearance space coordinates. Act 530 includes accessing a database of spatial appearance space coordinates. The database comprises multiple unique spatial appearance space coordinates associated with different reference coatings. For example, as depicted and described with respect to FIGS. 1, the computer system 100 comprises a spatial appearance space coordinates database 140. The one or more processors 130 access the spatial appearance space coordinates database 140 and identify spatial appearance space coordinates associated with potentially matching reference coatings.

The method 500 thus also comprises an act 540 of identifying spatial appearance space coordinates associated with potentially matching reference coatings. Act 540 identifies spatial appearance space coordinates associated with a plurality of potentially matching reference coatings from the database of spatial appearance space coordinates. For example, as depicted and described with respect to FIGS. 1, 3, and 4, the computer system 100 identifies, from within the database 140, spatial appearance space coordinates associated with a plurality of potentially matching reference coatings that are relatively close to the target spatial appearance space coordinates. FIG. 3 depicts a predetermined spatial appearance space coordinates 310 and the target spatial appearance space coordinates 210. Similarly, FIG. 4 depicts a predetermined spatial appearance space coordinates 410 and the target spatial appearance space coordinates 210.

Method 500 also comprises an act 550 of calculating a spatial-appearance-space distance between spatial appearance space coordinates. Act 550 includes calculating a spatial-appearance-space distance between the predetermined spatial appearance space coordinates and the target spatial appearance space coordinates for each of the potentially matching reference coatings associated with the identified spatial appearance space coordinates. For instance, as depicted and described with respect to FIGS. 3 and 4, the computer system 100 calculates spatial-appearance-space distance 300 between target spatial appearance space coordinates 210 and predetermined spatial appearance space coordinates 310 and the spatial-appearance-space distance 400 between target spatial appearance space coordinates 210 and predetermined spatial appearance space coordinates 410.

Further, method 500 comprises an act 560 of identifying spatial appearance space coordinates with smallest spatial-appearance-space distance to target coating. Act 560 includes identifying particular spatial appearance space coordinates from the identified spatial appearance space coordinates associated with the plurality of potentially matching reference coatings that are associated with a smallest spatial-appearance-space distance from the spatial appearance space coordinates of the target coating. For instance, as depicted and described with respect to FIGS. 3 and 4, the computer system 100 determines that spatial-appearance-space distance 300 is smaller than spatial-appearance-space distance 400. Based upon this information, the computer system 100 determines that the coating associated with predetermined spatial appearance space coordinates 310 is the proposed spatial appearance space coordinates.

Further still, method 500 comprises an act 570 of displaying a visual interface element indicating proposed spatial appearance match to the target coating. Act 570 includes displaying a visual interface element indicating the reference coating that is associated with the particular spatial appearance space coordinates as a proposed spatial appearance match to the target coating. For example, the computer system 100 may display the three-dimensional coordinate system 200 of FIG. 3 with the target spatial appearance space coordinates 210, with its associated planar points 220, 230, 240, and the proposed spatial appearance space coordinates 310, with its associated planar points 320, 330, 340. Using both the coordinates 210, 310 and the planar points 220, 230, 240, 320, 330, 340, a user can quickly and easily identify the proximity of the match as well as individual differences within the planar points.

Figure 6:
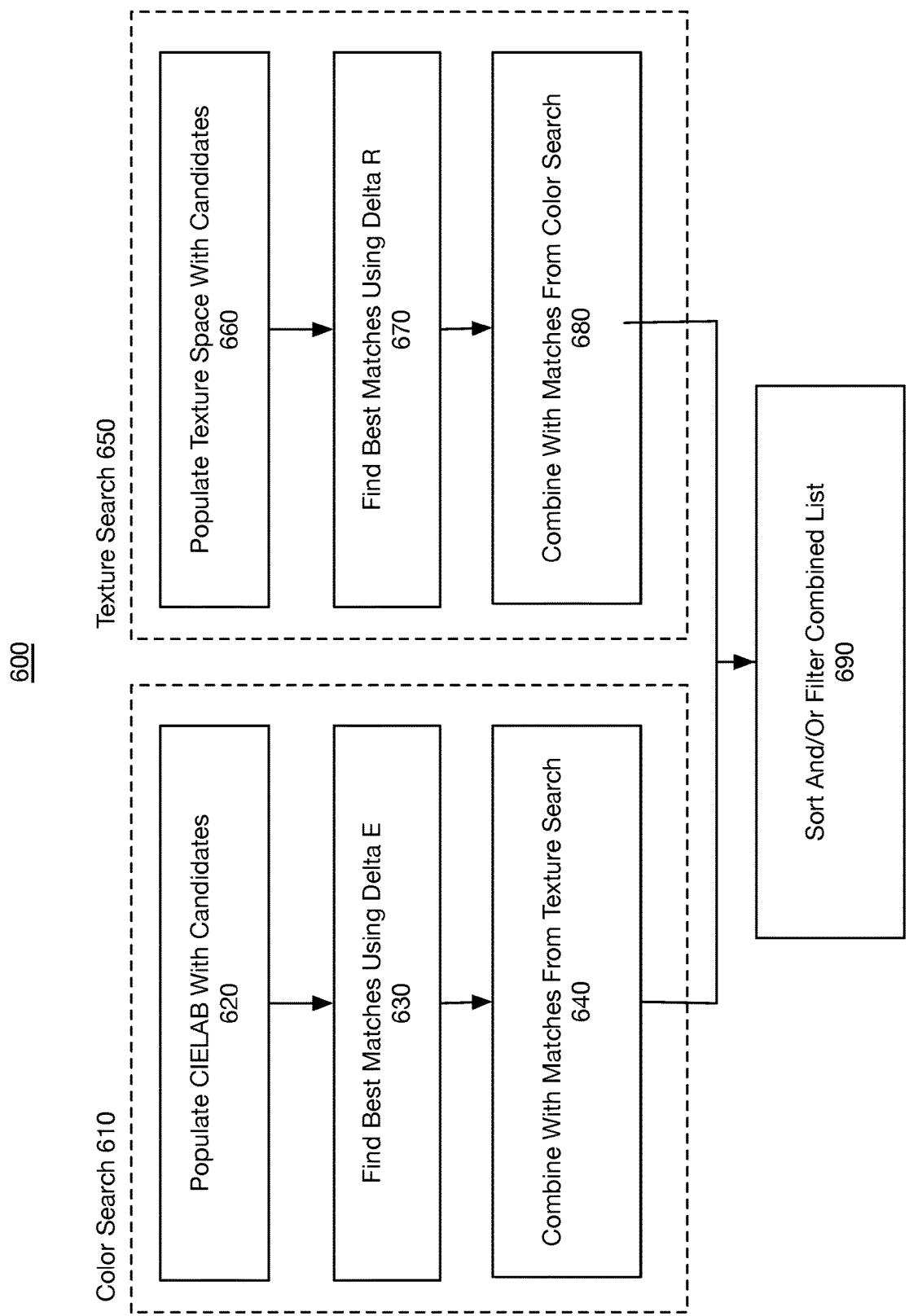
FIG. 6 depicts a flowchart of steps in an exemplary method for identifying proposed coating matches.

FIG. 6 depicts a flowchart of steps in an exemplary method for identifying proposed coating matches. In the depicted flowchart 600, the system performs a color search 610 in parallel with a texture search 650. By performing the searches in parallel, the system is able to provide computational efficiencies within multi-threaded processing systems.

Within the color search 610, the system receives one or more coating color variables of the target coating from the coating-measurement instrument 110 (shown in FIG. 1). The system then maps the one or more coating color variables to target color space coordinates within a color space. While any number of different known color spaces may be used, in at least one embodiment, the color space comprises the CIELAB color space.

The system identifies color space coordinates associated with a plurality of potentially matching color coatings from a database of reference coatings and associated color space coordinates. The system populates the CIELAB color space with the plurality of potentially matching color coatings (also referred to as candidate colors), shown as step 620. The system then calculates a color-space distance, also referred to as Delta E, between the identified color space coordinates associated with the potentially matching color coatings and the target color space coordinates of the target coating for each of the potentially matching color coatings.

As indicated by step 630, the system is then able to identify particular color space coordinates from the identified color space coordinates associated with the plurality of potentially matching color coatings that are associated with a smallest color-space distance from the color space coordinates of the target coating. For example, the system may select a set of particular color space coordinates that are associated with the closest distance match to the color space coordinates of the target coating. Additionally or alternatively, the system may select an entire set of potentially matching color coatings. The set of potentially matching color coatings may comprise coatings that are associated with coordinates that are within a threshold distance (Delta E) from the color space coordinates of the target coating. Alternatively, the set of potentially matching color coatings may comprise a threshold number of coatings that are associated with coordinates that are closest to the color space coordinates of the target coating. One will appreciate that because different color spaces may comprise different scales, the actual threshold values for distance between the color space coordinates of the target coating and coordinates of the potentially matching color coatings is somewhat arbitrary. In the described case, a user is able to select a threshold number of potentially matching coatings and/or a threshold Delta E distance based upon the user's particular use case and needs.

Within texture search 650, the system populates the texture space with candidates in step 660. As described above, the texture space comprises a subset of spatial appearance space and is generated using the methods and systems described herein. In step 670, the system finds the best texture space matches by identifying proposed texture matches within the smallest spatial-appearance-space distance from the coordinates of the target coating within the spatial distance space. As used herein, the spatial-appearance-space distance is referred to as "Delta R." Steps 640 of combining matches from the texture search, step 680 of combining matches from the color search, and step 690 of sort and/or filter combined list are described below with respect to FIG. 7.

Figure 7:
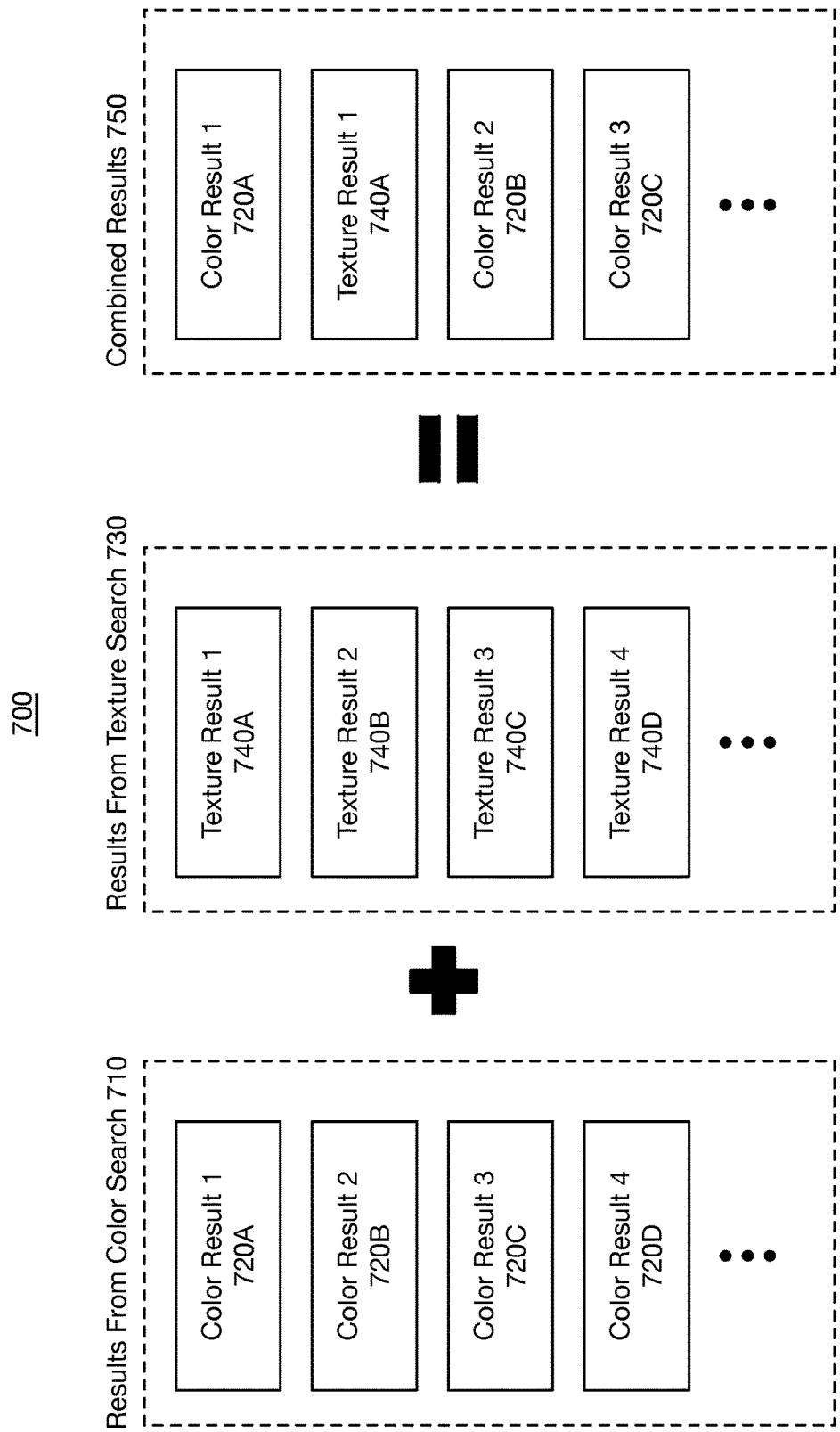
FIG. 7 depicts a schematic of an exemplary method for identifying proposed coating matches.

FIG. 7 depicts a schematic 700 of an exemplary method for identifying proposed coating matches. In FIG. 7, the results of the color search 710 are indicated as being a set of potential color matches 720(a-d). Similarly, the results of the texture search 730 are indicated as being a set of potential texture matches 740(a-d). Steps 640 and 680 from FIG. 6 are indicated by the combined results 750. In the depicted example, combined results 750 is generated by ordering the color results 720(a-d) and texture results 740(a-d) in order of increasing Delta E and Delta R. For instance, Color Result 1 (720A) comprises the smallest distance from the coordinates of the target color within each of the color space and the spatial appearance space. Texture Result 1 (740A) comprises the next smallest distance from the coordinates of the target color within each of the color space and the spatial appearance space. The combined results 750 continues in this pattern through Color Result 2 (720B), Color Result 3 (720C), and on through the desired numbers of proposed matching coatings.

Accordingly, as indicated in schematic 700, the system displays a visual interface element indicating a particular reference coating that is associated with the particular spatial appearance space coordinates and a particular color coating that is associated with the particular color space coordinates as proposed color matches to the target coating. While the recited scheme only indicates a single particular reference coating and a single particular color coating, one will appreciate that multiple reference coatings and color coatings can be displayed as indicated in the schematic 700. Additionally, as described above the system can order the particular reference coating and the particular color coating in order of increasing distance from the coordinates of the target coating within the respective color space and spatial appearance space.

Figure 8:
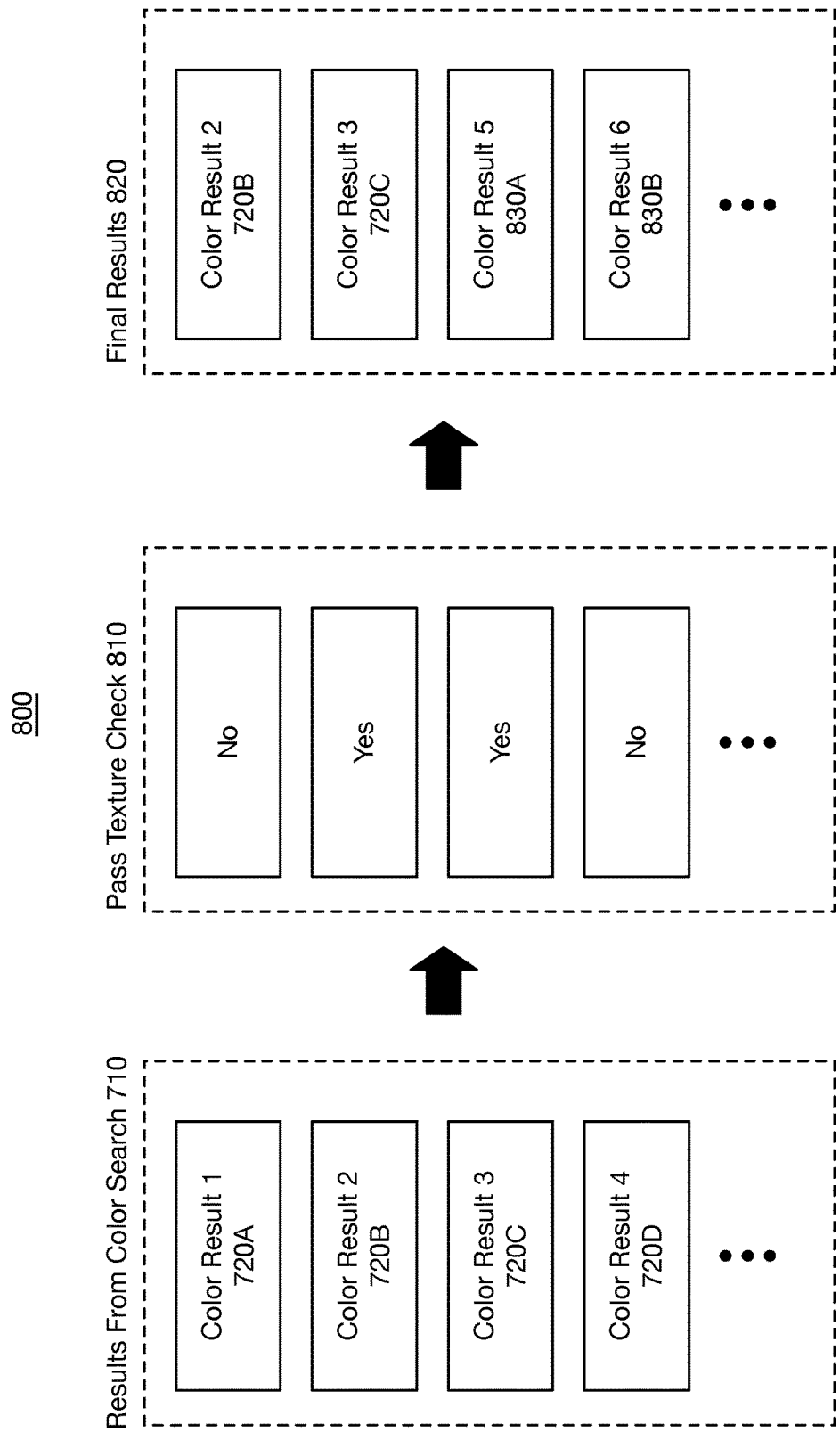
FIG. 8 depicts a schematic of another exemplary method for identifying proposed coating matches.

FIG. 8 depicts a schematic 800 of another exemplary method for identifying proposed coating matches. As depicted, the system generates results for the color search 710 as also indicated in FIG. 7. In particular, the system utilizes the steps described above with respect to FIG. 6 for receiving one or more coating color variables of the target coating from the coating-measurement instrument, mapping the one or more coating color variables to target color space coordinates within a color space, identifying color space coordinates associated with a plurality of potentially matching color coatings from a database of reference coatings and associated color space coordinates, and calculating a color-space distance between the identified color space coordinates associated with the potentially matching color coatings and the target color space coordinates of the target coating for each of said potentially matching color coatings.

Upon performing these steps, the system identifies a set of particular color space coordinates from the identified color space coordinates associated with the plurality of potentially matching color coatings that are within a threshold color-space distance from the color space coordinates of the target coating. As described above, the threshold can be set by the user based upon the desired number and quality of the proposed matching coatings.

The system then displays the visual interface element indicating a subset of particular color coatings that are associated with the set of particular color space coordinates as proposed color matches to the target coating. Specifically, the system performs a pass texture check 810 on each color result 720(A-D) within the results from the color search 710. The pass texture check 810 comprises identifying color results 720(A-D) that are associated with spatial-appearance-space distances that are within a threshold spatial-appearance-space distance to the target coating. As such, each identified color result 720(A-D) must be within a threshold of texture space difference from the target coating in order to be listed in the Final Results 820. As indicated above, this threshold may also be user set based upon user-defined constraints and needs. The resulting final results 820 then comprise the nearest color matches that are all within a threshold texture match from the target coating.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may comprise or utilize a special-purpose or general-purpose computer system that includes computer hardware, such as, for example, one or more processors and system memory, as discussed in greater detail below. The present invention may also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some configurations, such as a cloud-computing environment, may comprise a system that includes one or more hosts that are each capable of running one or more virtual machines. During operation, virtual machines emulate an operational computing system, supporting an operating system and perhaps one or more other applications as well. In some configurations, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention thus concerns inter alia, without being limited thereto, the following aspects:

1. A computerized method for mapping coatings to a spatial appearance space for use on a computer system comprising one or more processors and one or more computer-readable media having stored thereon executable instructions that when executed by the one or more processors configure the computer system to perform the method for mapping coatings to a spatial appearance space, the method comprising:

receiving a plurality of coating spatial appearance variables of a target coating from a coating-measurement instrument, wherein the plurality of coating spatial appearance variables comprises a graininess variable, a sparkle area variable, and a sparkle intensity variable;

generating target spatial appearance space coordinates for the target coating by mapping each of the plurality of coating spatial appearance variables to an individual axis in a multidimensional coordinate system, wherein:
the graininess variable is mapped to a first axis of the multidimensional coordinate system,
the sparkle area variable is mapped to a second axis of the multidimensional coordinate system, and
the sparkle intensity variable is mapped to a third axis of the multidimensional coordinate system;

accessing a database of spatial appearance space coordinates, wherein the database comprises multiple unique spatial appearance space coordinates in said multidimensional coordinate system associated with different reference coatings;

identifying spatial appearance space coordinates associated with a plurality of potentially matching reference coatings from the database of spatial appearance space coordinates;

calculating a spatial-appearance-space distance between the identified spatial appearance space coordinates associated with the potentially matching reference coatings and the spatial appearance space coordinates of the target coating for each of said potentially matching reference coatings;

identifying particular spatial appearance space coordinates from the identified spatial appearance space coordinates associated with the plurality of potentially matching reference coatings that are associated with a smallest spatial-appearance-space distance from the spatial appearance space coordinates of the target coating; and displaying a visual interface element indicating a particular reference coating that is associated with the particular spatial appearance space coordinates as a proposed spatial appearance match to the target coating.

2. The computerized method according to preceding aspect 1, wherein:
the graininess variable comprises graininess measurements taken at multiple angles by the coating-measurement instrument;
the sparkle area variable comprises sparkle area measurements taken at the multiple angles by the coating-measurement instrument; and
the sparkle intensity variable comprises sparkle intensity measurements taken at the multiple angles by the coating-measurement instrument.

3. The computerized method according to preceding aspect 2, wherein generating the spatial appearance space coordinates for the target coating by mapping the plurality of coating spatial appearance variables each to an individual axis of a multidimensional coordinate system further comprises:
mapping, on a per angle basis from the multiple angles, each graininess measurement from the graininess variable, each sparkle area measurements from the sparkle area variable, and each sparkle intensity measurement from the sparkle intensity variable to the corresponding axis of the multidimensional coordinate system, such that the target spatial appearance space coordinates comprise multiple angular dependent coordinates.

4. The computerized method according to preceding aspect 3, wherein calculating the spatial-appearance-space distance between each of the identified spatial appearance space coordinates associated with the potentially matching reference coatings and the spatial appearance space coordinates of the target coating further comprises:
calculating a plurality of distances between the spatial appearance space coordinates for a specific coating selected from the plurality of potentially matching reference coatings and the spatial appearance space coordinates for the target coating on a per angle basis, wherein each of the spatial appearance space coordinates for the specific coating and each of the spatial appearance space coordinates for the target coating are associated with a predetermined set of angles, such that the plurality of distances comprise calculated distances between the spatial appearance space coordinates for the target coating and the identified spatial appearance space coordinates for the specific coating on a per angle basis for each angle within the predetermined set of angles; and generating the spatial-appearance-space distance between the target coating and the specific coating by calculating a sum of squares of the plurality of distances.

5. The computerized method according to any one of preceding aspects 1 to 4, wherein the graininess variable comprises an identified contrast of light/dark irregular patterns exhibited by the target coating when viewed under illumination.

6. The computerized method according to any one of preceding aspects 1 to 5, wherein the sparkle area variable comprises an area segment of spots that are more than a threshold level brighter than their immediate surround on an illuminated portion of the target coating.

7. The computerized method according to any one of preceding aspects 1 to 6, wherein the sparkle intensity variable comprises a contrast between appearance highlights on particles of a gonioapparent pigment and the particles' immediate surroundings.

8. The computerized method according to any one of preceding aspects 1 to 7, wherein the displaying step comprises displaying a visual representation of the spatial appearance space coordinates for the target coating.

9. The computerized method according to any one of preceding aspects 1 to 8, wherein identifying the particular reference coating for matching the target coating comprises identifying the particular reference coating based upon the calculated spatial-appearance-space distance and at least one other coating attribute associated with the target coating.

10. The computerized method according to any one of preceding aspects 1 to 9, further comprising:
receiving one or more coating color variables of the target coating from the coating-measurement instrument;
mapping the one or more coating color variables to target color space coordinates within a color space;
identifying color space coordinates associated with a plurality of potentially matching color coatings from a database of reference coatings and associated color space coordinates;
calculating a color-space distance between the identified color space coordinates associated with the potentially matching color coatings and the target color space coordinates of the target coating for each of said potentially matching color coatings; and
identifying particular color space coordinates from the identified color space coordinates associated with the plurality of potentially matching color coatings that are associated with a smallest color-space distance from the color space coordinates of the target coating.

11. The computerized method according to preceding aspect 10, further comprising:
displaying the visual interface element indicating the particular reference coating that is associated with the particular spatial appearance space coordinates and a particular color coating that is associated with the particular color space coordinates as proposed color matches to the target coating; and
ordering the particular reference coating and the particular color coating in order of increasing distance from the coordinates of the target coating within the respective color space and spatial appearance space.

12. The computerized method according to any one of preceding aspects 1 to 9, wherein identifying the spatial appearance space coordinates associated with the plurality of potentially matching coatings from the database of spatial appearance space coordinates comprises:
receiving one or more coating color variables of the target coating from the coating-measurement instrument;
mapping the one or more coating color variables to target color space coordinates within a color space;
identifying color space coordinates associated with a plurality of potentially matching color coatings from a database of reference coatings and associated color space coordinates;
calculating a color-space distance between the identified color space coordinates associated with the potentially matching color coatings and the target color space coordinates of the target coating for each of said potentially matching color coatings;
identifying a set of particular color space coordinates from the identified color space coordinates associated with the plurality of potentially matching color coatings that are within a threshold color-space distance from the color space coordinates of the target coating; and
displaying the visual interface element indicating a subset of particular color coatings that are associated with the set of particular color space coordinates as proposed color matches to the target coating, wherein the subset of particular color coatings comprise color coatings that are associated with spatial-appearance-space distances that are within a threshold spatial-appearance-space distance to the target coating.

13. A computer system for mapping coatings to a spatial appearance space, e.g. for use with the computerized method according to any one of preceding aspects 1 to 12, the computer system comprising:
one or more processors; and
one or more computer-readable media having stored thereon executable instructions that when executed by the one or more processors configure the computer system to perform at least the following:
receive a plurality of coating spatial appearance variables of a target coating from a coating-measurement instrument, wherein the plurality of coating spatial appearance variables comprises a graininess variable, a sparkle area variable, and a sparkle intensity variable;
generate target spatial appearance space coordinates for the target coating by mapping each of the plurality of spatial appearance variables to an individual axis in a multidimensional coordinate system, wherein:
the graininess variable is mapped to a first axis of the multidimensional coordinate system,
the sparkle area variable is mapped to a second axis of the multidimensional coordinate system, and
the sparkle intensity variable is mapped to a third axis of the multidimensional coordinate system;
access a database of spatial appearance space coordinates, wherein the database comprises multiple unique spatial appearance space coordinates in said multidimensional coordinate system associated with different reference coatings;
identify spatial appearance space coordinates associated with a plurality of potentially matching reference coatings from the database of spatial appearance space coordinates;

calculate a spatial-appearance-space distance between the identified spatial appearance space coordinates associated with the potentially matching reference coatings and the spatial appearance space coordinates of the target coating for each of said potentially matching reference coatings;

identify particular spatial appearance space coordinates from the identified spatial appearance space coordinates associated with the plurality of potentially matching reference coatings that are associated with a smallest spatial-appearance-space distance from the spatial appearance space coordinates of the target coating; and display a visual interface element indicating a particular reference coating that is associated with the particular spatial appearance space coordinates as a proposed spatial appearance match to the target coating.

14. The computer system according to preceding aspect 13, wherein:
the graininess variable comprises graininess measurements taken at multiple angles by the coating-measurement instrument;
the sparkle area variable comprises sparkle area measurements taken at the multiple angles by the coating-measurement instrument; and
the sparkle intensity variable comprises sparkle intensity measurements taken at the multiple angles by the coating-measurement instrument.

15. The computer system according to aspect 14, wherein generating the spatial appearance space coordinates for the target coating by mapping the plurality of coating spatial appearance variables each to an individual axis of a multidimensional coordinate system further comprises:
mapping, on a per angle basis from the multiple angles, each graininess measurement from the graininess variable, each sparkle area measurements from the sparkle area variable, and each sparkle intensity measurement from the sparkle intensity variable to the corresponding axis of the multidimensional coordinate system, such that the target spatial appearance space coordinates comprise multiple angular dependent coordinates.

16. The computer system according to aspect 15, wherein calculating the spatial-appearance-space distance between each of the identified spatial appearance space coordinates associated with the potentially matching reference coatings and the spatial appearance space coordinates of the target coating further comprises:
calculating a plurality of distances between the spatial appearance space coordinates for a specific coating selected from the plurality of potentially matching reference coatings and the spatial appearance space coordinates for the target coating on a per angle basis, wherein each of the spatial appearance space coordinates for the specific coating and each of the spatial appearance space coordinates for the target coating are associated with a predetermined set of angles, such that the plurality of distances comprise calculated distances between the spatial appearance space coordinates for the target coating and the identified spatial appearance space coordinates for the specific coating on a per angle basis for each angle within the predetermined set of angles; and
generating the spatial-appearance-space distance between the target coating and the specific coating by calculating a sum of squares of the plurality of distances.

17. The computer system according to any one of preceding aspects 13 to 16, wherein the graininess variable comprises an identified contrast of light/dark irregular patterns exhibited by the target coating when viewed under illumination.

18. The computer system according to any one of preceding aspects 13 to 17, wherein the sparkle area variable comprises an area segment of spots that are more than a threshold level brighter than their immediate surround on an illuminated portion of the target coating.

19. The computer system according to any one of preceding aspects 13 to 18, wherein the sparkle intensity variable comprises a contrast between appearance highlights on particles of a gonioapparent pigment and the particles' immediate surroundings.

20. The computer system according to any one of preceding aspects 13 to 19, wherein the visual interface element comprises a visual representation of the spatial appearance space coordinates for the target coating.

21. The computer system according to any one of preceding aspects 13 to 20, wherein the executable instructions include instructions that are executable to further configure the computer system to:
receive one or more coating color variables of the target coating from the coating-measurement instrument; and
identify a color associated with the target coating.

22. The computer system according to any one of preceding aspects 13 to 21, wherein the executable instructions include instructions that are executable to further configure the computer system to create a formulation for the particular reference coating.

23. The computer system according to any one of preceding aspects 13 to 22, wherein identifying the spatial appearance space coordinates associated with the plurality of potentially matching reference coatings from the database of spatial appearance space coordinates comprises:
receiving a color code that is associated with the target coating, and identifying spatial appearance space coordinates for coatings that are associated with the color code.

24. A computer program product comprising one or more computer storage media having stored thereon computer-executable instructions that, when executed at a processor, cause a computer system, such as a computer system according to any one of preceding aspects 13 to 23, to perform a method for mapping coatings to a spatial appearance space, the method comprising:
receiving a plurality of coating spatial appearance variables of a target coating from a coating-measurement instrument, wherein the plurality of coating spatial appearance variables comprises a graininess variable, a sparkle area variable, and a sparkle intensity variable;
generating target spatial appearance space coordinates for the target coating by mapping each of the one or more coating spatial appearance variables to an individual axis in a multidimensional coordinate system, wherein:
the graininess variable is mapped to a first axis of the multidimensional coordinate system,
the sparkle area variable is mapped to a second axis of the multidimensional coordinate system, and
the sparkle intensity variable is mapped to a third axis of the multidimensional coordinate system;
accessing a database of spatial appearance space coordinates, wherein the database comprises multiple unique spatial appearance space coordinates in said multidimensional coordinate system associated with different reference coatings;

identifying spatial appearance space coordinates associated with a plurality of potentially matching reference coatings from the database of spatial appearance space coordinates;

calculating a spatial-appearance-space distance between the identified spatial appearance space coordinates associated with the potentially matching reference coatings and the spatial appearance space coordinates of the target coating for each of said potentially matching reference coatings;

identifying particular spatial appearance space coordinates from the identified spatial appearance space coordinates associated with the plurality of potentially matching reference coatings that are associated with a smallest spatial-appearance-space distance from the spatial appearance space coordinates of the target coating; and displaying a visual interface element indicating a particular reference coating that is associated with the particular spatial appearance space coordinates as a proposed spatial appearance match to the target coating.

25. The computer program product according to preceding aspect 24, comprising further computer-executable instructions that, when executed at a processor, cause the computer system, to perform the method for mapping coatings to a spatial appearance space with the additional features as defined above in any one of preceding aspects 2 to 12.

The present invention may be embodied in other specific forms without departing from its spirit or essential characteristics. The described inventions are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computerized method for mapping coatings to a spatial appearance space for use on a computer system comprising one or more processors and one or more computer-readable media having stored thereon executable instructions that when executed by the one or more processors configure the computer system to perform the method for mapping coatings to a spatial appearance space, the method comprising:
receiving a plurality of coating spatial appearance variables of a target coating from a coating-measurement instrument, wherein the plurality of coating spatial appearance variables comprises a graininess variable, a sparkle area variable, and a sparkle intensity variable;
generating target spatial appearance space coordinates for the target coating by mapping each of the plurality of coating spatial appearance variables to an individual axis in a multidimensional coordinate system, wherein:
the graininess variable is mapped to a first axis of the multidimensional coordinate system,
the sparkle area variable is mapped to a second axis of the multidimensional coordinate system, and
the sparkle intensity variable is mapped to a third axis of the multidimensional coordinate system;
accessing a database of spatial appearance space coordinates, wherein the database comprises multiple unique spatial appearance space coordinates in the multidimensional coordinate system associated with different reference coatings;

identifying spatial appearance space coordinates associated with a plurality of potentially matching reference coatings from the database of spatial appearance space coordinates;

calculating a spatial-appearance-space distance between the identified spatial appearance space coordinates associated with the potentially matching reference coatings and the spatial appearance space coordinates of the target coating for each of the potentially matching reference coatings;

identifying particular spatial appearance space coordinates from the identified spatial appearance space coordinates associated with the plurality of potentially matching reference coatings that are associated with a smallest spatial-appearance-space distance from the spatial appearance space coordinates of the target coating; and displaying a visual interface element indicating a particular reference coating that is associated with the particular spatial appearance space coordinates as a proposed spatial appearance match to the target coating.

2. The computerized method as recited in claim 1, wherein the graininess variable comprises an identified contrast of light/dark irregular patterns exhibited by the target coating when viewed under illumination.

3. The computerized method as recited in claim 1, wherein the sparkle area variable comprises an area segment of spots that are more than a threshold level brighter than their immediate surround on an illuminated portion of the target coating.

4. The computerized method as recited in claim 1, wherein the sparkle intensity variable comprises a contrast between appearance highlights on particles of a gonioapparent pigment and the particles' immediate surroundings.

5. The computerized method as recited in claim 1, wherein identifying the particular reference coating for matching the target coating comprises identifying the particular reference coatings based upon the calculated spatial-appearance-space distance and at least one other coating attribute associated with the target coating.

6. The computerized method as recited in claim 1, further comprising:
receiving one or more coating color variables of the target coating from the coating-measurement instrument;
mapping the one or more coating color variables to target color space coordinates within a color space;
identifying color space coordinates associated with a plurality of potentially matching color coatings from a database of reference coatings and associated color space coordinates;
calculating a color-space distance between the identified color space coordinates associated with the potentially matching color coatings and the target color space coordinates of the target coating for each of the potentially matching color coatings; and
identifying particular color space coordinates from the identified color space coordinates associated with the plurality of potentially matching color coatings that are associated with a smallest color-space distance from the color space coordinates of the target coating.

7. The computerized method as recited in claim 6, further comprising:
displaying the visual interface element indicating the particular reference coating that is associated with the particular spatial appearance space coordinates and a particular color coating that is associated with the particular color space coordinates as proposed color matches to the target coating; and ordering the particular reference coating and the particular color coating in order of increasing distance from the coordinates of the target coating within the respective color space and spatial appearance space.

8. The computerized method as recited in claim 1, wherein identifying the spatial appearance space coordinates associated with the plurality of potentially matching coatings from the database of spatial appearance space coordinates comprises:

receiving one or more coating color variables of the target coating from the coating-measurement instrument;

mapping the one or more coating color variables to target color space coordinates within a color space;

identifying color space coordinates associated with a plurality of potentially matching color coatings from a database of reference coatings and associated color space coordinates;

calculating a color-space distance between the identified color space coordinates associated with the potentially matching color coatings and the target color space coordinates of the target coating for each of the potentially matching color coatings;

identifying a set of particular color space coordinates from the identified color space coordinates associated with the plurality of potentially matching color coatings that are within a threshold color-space distance from the color space coordinates of the target coating; and displaying the visual interface element indicating a subset of particular color coatings that are associated with the set of particular color space coordinates as proposed color matches to the target coating, wherein the subset of particular color coatings comprise color coatings that are associated with spatial-appearance-space distances that are within a threshold spatial-appearance-space distance to the target coating.

9. A computer system for mapping coatings to a spatial appearance space, comprising:

one or more processors; and one or more media computer-readable having stored thereon executable instructions that when executed by the one or more processors configure the computer system to perform at least the following:

receive a plurality of coating spatial appearance variables of a target coating from a coating-measurement instrument, wherein the plurality of coating spatial appearance variables comprises a graininess variable, a sparkle area variable, and a sparkle intensity variable;

generate target spatial appearance space coordinates for the target coating by mapping each of the plurality of coating spatial appearance variables to an individual axis in a multidimensional coordinate system, wherein:
the graininess variable is mapped to a first axis of the multidimensional coordinate system,
the sparkle area variable is mapped to a second axis of the multidimensional coordinate system, and
the sparkle intensity variable is mapped to a third axis of the multidimensional coordinate system;

access a database of spatial appearance space coordinates, wherein the database comprises multiple unique spatial appearance space coordinates in the multidimensional coordinate system associated with different reference coatings;

identify spatial appearance space coordinates associated with a plurality of potentially matching reference coatings from the database of spatial appearance space coordinates;

calculate a spatial-appearance-space distance between the identified spatial appearance space coordinates associated with the potentially matching reference coatings and the spatial appearance space coordinates of the target coating for each of the potentially matching reference coatings;

identify particular spatial appearance space coordinates from the identified spatial appearance space coordinates associated with the plurality of potentially matching reference coatings that are associated with a smallest spatial-appearance-space distance from the spatial appearance space coordinates of the target coating; and display a visual interface element indicating a particular reference coating that is associated with the particular spatial appearance space coordinates as a proposed spatial appearance match to the target coating.

10. The computer system as recited in claim 9, wherein:

the graininess variable comprises graininess measurements taken at multiple angles by the coating-measurement instrument;

the sparkle area variable comprises sparkle area measurements taken at the multiple angles by the coating-measurement instrument; and the sparkle intensity variable comprises sparkle intensity measurements taken at the multiple angles by the coating-measurement instrument.

11. The computer system as recited in claim 10, wherein generating the target spatial appearance space coordinates for the target coating by mapping each of the plurality of coating spatial appearance variables to an individual axis in a multidimensional coordinate system further comprises:

mapping, on a per angle basis from the multiple angles, each graininess measurement from the graininess variable, each sparkle area measurements from the sparkle area variable, and each sparkle intensity measurement from the sparkle intensity variable to a corresponding axis of the multidimensional coordinate system, such that the target spatial appearance space coordinates comprise multiple angular dependent coordinates.

12. The computer system as recited in claim 11, wherein calculating the spatial-appearance-space distance between the identified spatial appearance space coordinates associated with the potentially matching reference coatings and the spatial appearance space coordinates of the target coating for each of the potentially matching reference coatings further comprises:

calculating a plurality of distances between the spatial appearance space coordinates for a specific coating selected from the plurality of potentially matching reference coatings and the spatial appearance space coordinates for the target coating on a per angle basis, wherein each of the spatial appearance space coordinates for the specific coating and each of the spatial appearance space coordinates for the target coating are associated with a predetermined set of angles, such that the plurality of distances comprise calculated distances between the spatial appearance space coordinates for the target coating and the identified spatial appearance space coordinates for the specific coating on a per angle basis for each angle within the predetermined set of angles; and generating the spatial-appearance-space distance between the target coating and the specific coating by calculating a sum of squares of the plurality of distances.

13. The computer system as recited in claim 9, wherein the graininess variable comprises an identified contrast of light/dark irregular patterns exhibited by the target coating when viewed under illumination.

14. The computer system as recited in claim 9, wherein the sparkle area variable comprises an area segment of spots that are more than a threshold level brighter than their immediate surround on an illuminated portion of the target coating.

15. The computer system as recited in claim 9, wherein the sparkle intensity variable comprises a contrast between appearance highlights on particles of a gonioapparent pigment and the particles' immediate surroundings.

16. The computer system as recited in claim 9, wherein the visual interface element comprises a visual representation of the spatial appearance space coordinates for the target coating.

17. The computer system as recited in claim 9, wherein the executable instructions include instructions that are executable to further configure the computer system to:
receive one or more coating color variables of the target coating from the coating-measurement instrument;
map the one or more coating color variables to target color space coordinates within a color space;
identify color space coordinates associated with a plurality of potentially matching color coatings from a database of reference coatings and associated color space coordinates;
calculate a color-space distance between the identified color space coordinates associated with the potentially matching color coatings and the target color space coordinates of the target coating for each of the potentially matching color coatings; and
identify particular color space coordinates from the identified color space coordinates associated with the plurality of potentially matching color coatings that are associated with a smallest color-space distance from the color space coordinates of the target coating.

18. The computer system as recited in claim 17, wherein the executable instructions include instructions that are executable to further configure the computer system to:
display the visual interface element indicating the particular reference coating that is associated with the particular spatial appearance space coordinates and a particular color coating that is associated with the particular color space coordinates as proposed color matches to the target coating; and
order the particular reference coating and the particular color coating in order of increasing distance from the coordinates of the target coating within the respective color space and spatial appearance space.

19. The computer system as recited in claim 9, wherein the executable instructions include instructions that are executable to further configure the computer system to:
receive one or more coating color variables of the target coating from the coating-measurement instrument;
map the one or more coating color variables to target color space coordinates within a color space;
identify color space coordinates associated with a plurality of potentially matching color coatings from a database of reference coatings and associated color space coordinates;
calculate a color-space distance between the identified color space coordinates associated with the potentially matching color coatings and the target color space coordinates of the target coating for each of the potentially matching color coatings;
identify a set of particular color space coordinates from the identified color space coordinates associated with the plurality of potentially matching color coatings that are within a threshold color-space distance from the color space coordinates of the target coating; and
display the visual interface element indicating a subset of particular color coatings that are associated with the set of particular color space coordinates as proposed color matches to the target coating, wherein the subset of particular color coatings comprise color coatings that are associated with spatial-appearance-space distances that are within a threshold spatial-appearance-space distance to the target coating.

20. A computer program product comprising one or more non-transitory computer storage media having stored thereon computer-executable instructions that, when executed at a processor, cause a computer system to perform a method for mapping coatings to a spatial appearance space, the method comprising:
receiving a plurality of coating spatial appearance variables of a target coating from a coating-measurement instrument, wherein the plurality of coating spatial appearance variables comprises a graininess variable, a sparkle area variable, and a sparkle intensity variable;
generating target spatial appearance space coordinates for the target coating by mapping each of the one or more coating spatial appearance variables to an individual axis in a multidimensional coordinate system, wherein:
the graininess variable is mapped to a first axis of the multidimensional coordinate system,
the sparkle area variable is mapped to a second axis of the multidimensional coordinate system, and
the sparkle intensity variable is mapped to a third axis of the multidimensional coordinate system;
accessing a database of spatial appearance space coordinates, wherein the database comprises multiple unique spatial appearance space coordinates in the multidimensional coordinate system associated with different reference coatings;
identifying spatial appearance space coordinates associated with a plurality of potentially matching reference coatings from the database of spatial appearance space coordinates;
calculating a spatial-appearance-space distance between the identified spatial appearance space coordinates associated with the potentially matching reference coatings and the spatial appearance space coordinates of the target coating for each of the potentially matching reference coatings;
identifying particular spatial appearance space coordinates from the identified spatial appearance space coordinates associated with the plurality of potentially matching reference coatings that are associated with a smallest spatial-appearance-space distance from the spatial appearance space coordinates of the target coating; and
displaying a visual interface element indicating a particular reference coating that is associated with the particular spatial appearance space coordinates as a proposed spatial appearance match to the target coating.

* * * * *